US012798763B2

(12) United States Patent
Zhang

(10) Patent No.: US 12,798,763 B2
(45) Date of Patent: Nov. 17, 2026

(54) DISC-SHAPED AIRCRAFT

(71) Applicant: Yi Zhang, Quito (EC)

(72) Inventor: Yi Zhang, Quito (EC)

( * ) Notice: Subject to any disclaimer, the term of this patent is extended or adjusted under 35 U.S.C. 154(b) by 0 days.

(21) Appl. No.: 19/441,751

(22) Filed: Jan. 6, 2026

(65) Prior Publication Data

US 2026/0192920 A1 Jul. 9, 2026

Related U.S. Application Data

(60) Provisional application No. 63/742,943, filed on Jan. 8, 2025.

(51) Int. Cl.
*B64C 15/12* (2006.01)
*B64C 39/00* (2023.01)

(52) U.S. Cl.
CPC ............ *B64C 15/12* (2013.01); *B64C 39/001* (2013.01)

(58) Field of Classification Search
CPC ...... B64C 39/001; B64C 39/062; B64C 15/12
See application file for complete search history.

(56) References Cited

U.S. PATENT DOCUMENTS 3,507,461 A * 4/1970 Rosta .................... B64C 39/001 D12/325
3,632,065 A * 1/1972 Rosta ...................... B64C 27/20 244/17.11
8,464,978 B2 * 6/2013 Yim .................... B64C 29/0033 244/17.23
2022/0388654 A1 * 12/2022 Kandasamy ............ B64C 25/62
2023/0113569 A1 * 4/2023 Marcel ....................... B60F 5/02 244/17.23

FOREIGN PATENT DOCUMENTS

CN 111907701 A * 11/2020 ........... B64D 27/023
DE 10331740 A1 * 2/2005 ............. B64G 1/411

* cited by examiner

*Primary Examiner* — Joshua J Michener
*Assistant Examiner* — Ryan Andrew Yankey
(74) *Attorney, Agent, or Firm* — Quarles & Brady LLP

(57) ABSTRACT

Apparatuses, systems, methods, and non-transitory computer-readable media are provided for disc-shaped aircraft. An aircraft may include a first electric motor and a second electric motor within a motor housing. The aircraft may include an annular structure with a disc-shaped extension, and a first ring and a second ring attached to an inner side of the annular structure. The first ring and the second ring may be rotatably coupled to the motor housing to support the motor housing and to enable the motor housing to rotate with respect to the first ring and the second ring. The aircraft may include a third electric motor configured to drive a first roller to rotate the motor housing about a first axis when the first roller is engaged with a curved outer surface of the motor housing.

20 Claims, 20 Drawing Sheets

DISC-SHAPED AIRCRAFT

CROSS-REFERENCE TO RELATED APPLICATIONS

This application claims the benefit of priority of U.S. Provisional Patent Application No. 63/742,943, filed on Jan. 8, 2025, which is incorporated herein by reference in its entirety.

TECHNICAL FIELD

The present disclosure generally relates to the field of aircraft. More specifically, the present disclosure relates to disc-shaped aircraft and control thereof.

SUMMARY

Disclosed embodiments may include apparatuses, systems, methods, and non-transitory computer-readable media for disc-shaped aircraft. In some examples, an aircraft may include: a motor housing having a shape of a ball with an upper opening and a lower opening; a first propeller; a second propeller; and a first electric motor within the motor housing. The first electric motor may be affixed to the motor housing and may be configured to drive the first propeller. The aircraft may include a second electric motor within the motor housing. The second electric motor may be affixed to the motor housing and may be configured to drive the second propeller. The first electric motor and the second electric motor may be configured to propel air through the upper opening and the lower opening. The aircraft may include an annular structure with a disc-shaped extension. The annular structure may encircle the motor housing and may be positioned around a middle section of the motor housing between the upper opening and the lower opening. The aircraft may include a first ring attached to an inner side of the annular structure. A diameter of the first ring may be smaller than a diameter of the motor housing. The aircraft may include a second ring attached to the inner side of the annular structure. A diameter of the second ring may be smaller than the diameter of the motor housing. The first ring and the second ring may be configured to hold the motor housing, with the first ring encircling an upper section of the motor housing and with the second ring encircling a lower section of the motor housing. The aircraft may include a third electric motor configured to drive a first friction ring to rotate the motor housing about a first axis when the first friction ring is engaged with the motor housing. The aircraft may include a first motor engagement mechanism including a first actuator that may be configured to move a location of the third electric motor to cause the first friction ring to selectively contact and disengage from the motor housing. The aircraft may include a fourth electric motor configured to drive a second friction ring to rotate the motor housing about a second axis when the second friction ring is engaged with the motor housing. The aircraft may include a second motor engagement mechanism including a second actuator that may be configured to move a location of the fourth electric motor to cause the second friction ring to selectively contact and disengage from the motor housing.

In some examples, the first ring may have at least three bearing balls placed on an inner side of the first ring. The second ring may have at least three bearing balls placed on an inner side of the second ring. The at least three bearing balls of the first ring and the at least three bearing balls of the second ring may be configured to be in contact with the motor housing and may allow rotational movement of the motor housing with respect to the first ring and the second ring.

In some examples, the first motor engagement mechanism may include an elastic arm. A first terminal section of the elastic arm may be rotationally fixed with respect to the first ring. The third electric motor may be attached to a first side of a second terminal section of the elastic arm. An electromagnet may be attached to a second side of the second terminal section of the elastic arm.

In some examples, the first motor engagement mechanism may include a U-shaped metal piece including the elastic arm. The electromagnet may be placed relative to a permanent magnet that may be rotationally fixed with respect to the first ring. An activation of the electromagnet may cause a positional movement of the third electric motor and cause the first friction ring to be in contact with the motor housing.

In some examples, the aircraft may include a fifth electric motor configured to facilitate rotation of the motor housing about the first axis, and a sixth electric motor configured to facilitate rotation of the motor housing about the second axis.

In some examples, the first axis may be perpendicular to the second axis.

In some examples, the aircraft may include a first cabin housing attached to an upper side of the disc-shaped extension, and a second cabin housing attached to a lower side of the disc-shaped extension.

In some examples, the first cabin housing may include one or more parachutes. The aircraft may include a detachment mechanism configured to allow the first cabin housing to detach from the disc-shaped extension based on the parachutes being activated.

In some examples, the aircraft may include landing legs attached to a lower side of the second cabin housing.

In some examples, the aircraft may include one or more telecommunication antennas placed in the landing legs.

In some examples, the aircraft may include a computing device configured to communicate with a remote control device and to control one or more of: the first electric motor, the second electric motor, the third electric motor, the fourth electric motor, the first motor engagement mechanism, or the second motor engagement mechanism. The aircraft may include one or more power sources connected to one or more of: the computing device, the first electric motor, the second electric motor, the third electric motor, the fourth electric motor, the first motor engagement mechanism, or the second motor engagement mechanism.

In some examples, the first electric motor may be configured to cause rotational force, to the motor housing, that may cancel rotational force caused by the second electric motor to the motor housing.

In some examples, the first friction ring may include a rubber ring. The second friction ring may include a rubber ring.

In some examples, the first electric motor may be affixed to the motor housing via a first beam structure. The second electric motor may be affixed to the motor housing via a second beam structure.

In some examples, the motor housing may be rotatably coupled to the first ring and the second ring.

In some examples, an aircraft may include a motor housing having a curved outer surface, an upper opening, and a lower opening. The aircraft may include a first propeller, a second propeller, and a first electric motor within the motor housing. The first electric motor may be affixed to the motor housing and may be configured to drive the first propeller. The aircraft may include a second electric motor within the motor housing. The second electric motor may be affixed to the motor housing and may be configured to drive the second propeller. The aircraft may include an annular structure with a disc-shaped extension. The annular structure may encircle the motor housing. The aircraft may include a first ring attached to an inner side of the annular structure, and a second ring attached to the inner side of the annular structure. The first ring and the second ring may be rotatably coupled to the motor housing to support the motor housing and to enable the motor housing to rotate with respect to the first ring and the second ring. The aircraft may include a third electric motor configured to drive a first roller to rotate the motor housing about a first axis when the first roller is engaged with the curved outer surface of the motor housing. The aircraft may include a first motor engagement mechanism including a first actuator that may be configured to move a location of the third electric motor to cause the first roller to selectively contact and disengage from the curved outer surface of the motor housing.

In some examples, the aircraft may include a computing device configured to: receive, wirelessly, a thrust command from a remote control device; control the first electric motor and the second electric motor based on the thrust command; receive, wirelessly, a directional command from the remote control device; and control the third electric motor based on the directional command to rotate the motor housing to change a direction of thrust generated by the first electric motor and the second electric motor.

In some examples, the aircraft may include a fourth electric motor configured to drive a second roller to rotate the motor housing about a second axis when the second roller is engaged with the curved outer surface of the motor housing, the second axis perpendicular to the first axis. The aircraft may include a second motor engagement mechanism including a second actuator that may be configured to move a location of the fourth electric motor to cause the second roller to selectively contact and disengage from the curved outer surface of the motor housing. The computing device is further configured to: receive, wirelessly, a second directional command from the remote control device; and control the fourth electric motor based on the second directional command to rotate the motor housing to change the direction of thrust generated by the first electric motor and the second electric motor.

In some examples, a computing device of an aircraft may receive, from a remote control device, a thrust command. The aircraft may include a motor housing having a curved outer surface, an upper opening, and a lower opening. The motor housing may contain a first electric motor and a second electric motor. The first electric motor may be affixed to the motor housing and may be configured to drive a first propeller. The second electric motor may be affixed to the motor housing and may be configured to drive a second propeller. The computing device may control, based on the thrust command, the first electric motor and the second electric motor to generate thrust. The computing device may receive, from the remote control device, a first directional command to cause the motor housing to rotate about a first axis with respect to an annular structure with a disc-shaped extension of the aircraft. The annular structure may encircle the motor housing and may be positioned around a middle section of the motor housing between the upper opening and the lower opening. A first ring may be attached to an inner side of the annular structure. A second ring may be attached to the inner side of the annular structure. The first ring and the second ring may be configured to hold the motor housing. The computing device may control, based on the first directional command, a first actuator of a first motor engagement mechanism to move a third electric motor to cause a first friction ring driven by the third electric motor to contact the motor housing. The computing device may control, based on the first directional command, the third electric motor to rotate the motor housing about the first axis to change a direction of thrust generated by the first electric motor and the second electric motor. The computing device may receive, from the remote control device, a second directional command to cause the motor housing to rotate about a second axis with respect to the annular structure. The computing device may control, based on the second directional command: a second actuator of a second motor engagement mechanism to move a fourth electric motor to cause a second friction ring driven by the fourth electric motor to contact the motor housing, and the first actuator to move the third electric motor to disengage the motor housing. The computing device may control, based on the second directional command, the fourth electric motor to rotate the motor housing about the second axis to change a direction of thrust generated by the first electric motor and the second electric motor.

In some examples, the controlling, based on the thrust command, of the first electric motor and the second electric motor to generate thrust may include controlling the first electric motor to drive the first propeller in a first rotational direction to generate airflow out of the lower opening, and controlling the second electric motor to drive the second propeller in a second rotational direction, opposite the first rotational direction, to generate airflow out of the lower opening.

Consistent with disclosed embodiments, non-transitory computer-readable media may store instructions that, when executed by one or more processors, may cause the one or more processors to perform any of the processes described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
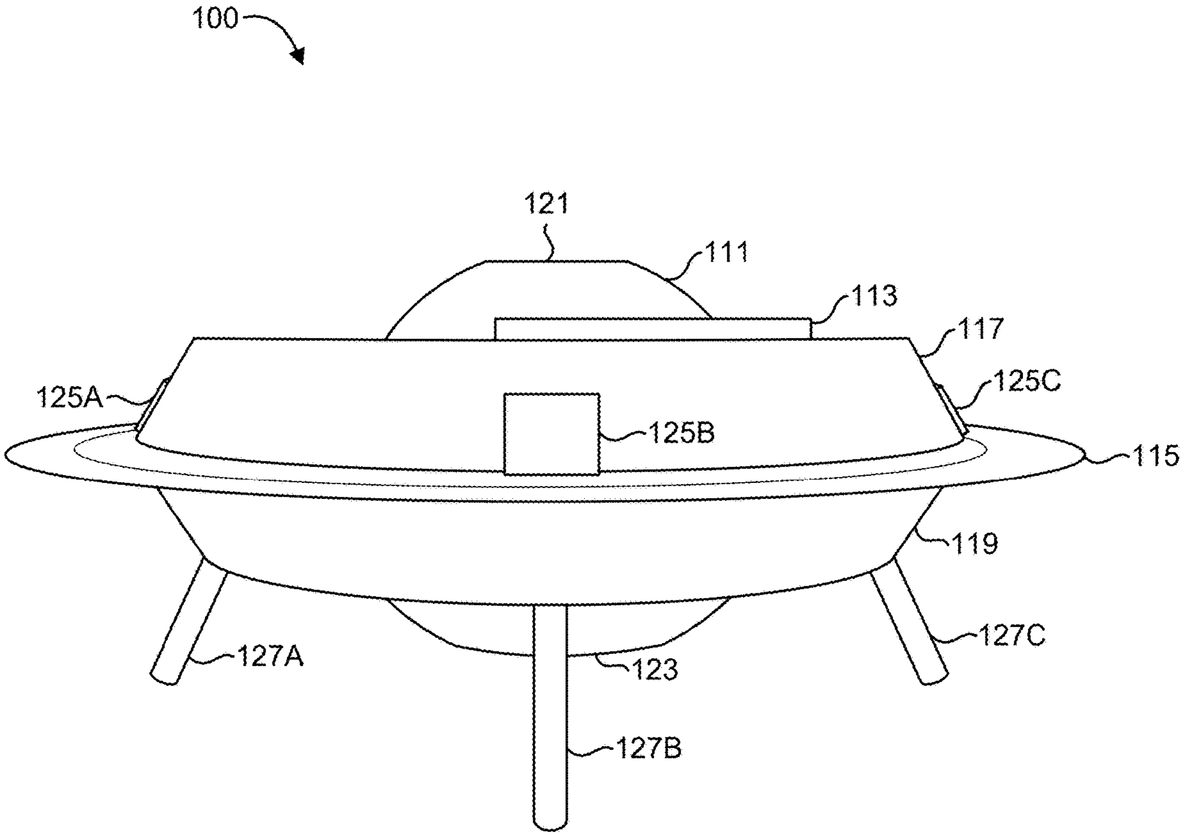
FIG. 1 illustrates an example of a disc-shaped aircraft from an angled perspective, consistent with some embodiments of the present disclosure.

The following detailed description refers to the accompanying drawings. Wherever possible, the same reference numbers are used in the drawings and the following description to refer to the same or similar parts. While several illustrative examples are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples but is inclusive of general principles described herein and illustrated in the figures in addition to the general principles encompassed by the appended claims.

Aircraft may take many forms including the form of an airplane, a helicopter, a rocket, a hot air balloon, or an airship. Some larger aircraft are designed to carry passengers and/or cargo. Other aircraft designed in a smaller size may be used as drones or toy aircraft. Drones or toy aircraft having forms or shapes that are not designed according to engineering principles may not fly properly. Unconventional aircraft designs of unique shapes or forms may be desirable for various reasons, including for accomplishing specific tasks, meeting design constraints, or novelty purposes. Both conventional and unconventional aircraft present challenges in design and control to ensure proper operation and flight maneuverability. A need for such aircraft design and control exists, particularly for drones and toy aircraft that are increasingly available and desirable for various uses.

FIG. 1 illustrates an example of a disc-shaped aircraft 100 from an angled perspective, consistent with some embodiments of the present disclosure. The aircraft 100 may include a motor housing 111 having a shape of a ball with an upper opening 121 and a lower opening 123. As shown, the motor housing 111 may have a curved outer surface providing the ball-shape. In some examples, the curved outer surface may be a curved surface connecting the upper opening 121 and the lower opening 123. In some examples, the motor housing 111 may be a sphere with the upper and lower openings 121, 123. In other examples, the motor housing 111 may be a spheroid, or substantially spheroid, with upper and lower openings 121, 123. A substantially spheroid shape, as used herein, may include a shape that has spheroidal outer surface but for minor ridges, indents, or similar structures (e.g., deviating from a surface of the spheroid by less than 10% of a diameter of the spheroid) or gaps or holes of a size equal to or smaller in surface area than the upper or lower openings 121, 123.

The motor housing 111 may include one or more sources of thrust, such as electric motors and propellers, and may provide propulsion to the aircraft (e.g., to allow the aircraft to fly upward or in other desired directions, hover, or descend in a controlled manner). The aircraft may include an annular structure 113 with a disc-shaped extension 115. The annular structure 113 may include a base and a vertical wall connected to the base and extending vertically from the base (e.g., upward and downward). The disc-shaped extension 115 may extend horizontally from the base of the annular structure 113. In some examples, the vertical wall of the annular structure 113 may have a shape of a cylindrical shell. Additionally or alternatively, the vertical wall of the annular structure 113 may have a shape of a portion of a cylindrical shell (e.g., when viewed from a top-down perspective, having a half of a circle, three fourths of a circle, one third of a circle, or any other desired percentage of a circle). The annular structure 113 may encircle the motor housing 111 and may be positioned around a middle section of the motor housing 111 between the upper opening 121 and the lower opening 123.

The aircraft 100 may include a first cabin housing 117 attached to an upper side of the disc-shaped extension 115, and a second cabin housing 119 attached to a lower side of the disc-shaped extension 115. The first cabin housing 117 and the second cabin housing 119 may each have a generally annular shape defining an inner ring area, within which the motor housing 111 may be located. As illustrated in FIG. 1, the first cabin housing 117 and the second cabin housing 119 may each have a height that is less than a radius of the motor housing 111. In other examples, however, the height of the first cabin housing 117 and/or the second cabin housing 119 may vary to be at or taller than the radius of the motor housing 111. In some examples, the aircraft may include landing legs 127A, 127B, 127C attached to a lower side of the second cabin housing 119. Additionally or alternatively, the aircraft may include another number of landing legs (e.g., four landing legs, five landing legs, six landing legs, or any other desired number of landing legs). In some examples, the aircraft may include one or more telecommunication antennas placed in the landing legs 127A, 127B, 127C. Via the telecommunication antennas, a computing device of the aircraft may communicate with another computing device (e.g., a remote control device, as described further herein).

The aircraft 100 may include elastic pieces (e.g., elastic pieces 125A, 125B, 125C). The elastic pieces may be tilted towards the first cabin housing 117 in such a manner that the elastic pieces may contact the side surface of the first cabin housing 117 and hold the first cabin housing 117 onto the disc-shaped extension 115. In some examples, the side surface of the first cabin housing 117 may be inclined in a same or similar manner as the elastic pieces to allow the first cabin housing 117 to be embedded within the elastic pieces tightly. The elastic pieces may include, for example, elastic metal sheets, elastic plastic sheets, or other elastic arms having any desired shape, texture, material, or design. Three elastic pieces 125A, 125B, 125C are shown in FIG. 1, but a larger number or smaller number of elastic pieces may be used to hold the first cabin housing 117 onto the disc-shaped extension 115. In some examples, the aircraft 100 may not include the elastic pieces such as 125A, 125B, 125C, and other mechanisms (e.g., fastening mechanisms) may be used to attach the first cabin housing 117 to the disc-shaped extension 115.

In some examples, the first cabin housing 117 may include one or more parachutes. The parachutes may be activated, for example, when the aircraft loses propulsion from the motor housing 111 (e.g., when the electric motors and propellers in the motor housing 111 stop generating thrust). The parachutes may be activated automatically or in response to a trigger signal received via a telecommunication antenna of the aircraft. The aircraft may include a detachment mechanism configured to allow the first cabin housing 117 to detach from the disc-shaped extension 115 based on the parachutes being activated. For example, the detachment mechanism may include the elastic pieces of the aircraft (e.g., the elastic pieces 125A, 125B, 125C). The force from the activated parachutes pulling the first cabin housing 117 in an upward direction and the gravitational force pulling the aircraft components other than the first cabin housing 117 in a downward direction may cause the elastic pieces of the aircraft (e.g., the elastic pieces 125A, 125B, 125C) to change their shapes (e.g., flex outward) and cause the first cabin housing 117 to come out of the holding by the elastic pieces. Thus, the first cabin housing 117 may, with the activated parachutes, slowly descend and then land on a ground, separately from the other components of the aircraft. Because of the detaching of the first cabin housing 117 from the remainder of the aircraft, the remainder of the aircraft may descend in free fall and faster than the first cabin housing 117. In some examples, after the detaching of the first cabin housing 117 from the remainder of the aircraft, the remainder of the aircraft may be configured to re-activate the propulsion from the motor housing 111, so that the remainder of the aircraft may descend in a controlled manner and avoid a crash.

In some examples, the aircraft may include a detachment mechanism configured to cause the first cabin housing 117 to detach from the disc-shaped extension 115. For example, actuators may be placed between the first cabin housing 117 and the disc-shaped extension 115, and may be configured to, for example, based on a command from a remote control device, push the first cabin housing 117 upward and away from disc-shaped extension 115, causing the first cabin housing 117 to detach from the disc-shaped extension 115. The parachutes may be configured to be activated based on the first cabin housing 117 detaching from the disc-shaped extension 115.

In some examples, the aircraft 100 may be a drone or toy aircraft. For example, in some examples, the aircraft 100 may be less than 250 grams (e.g., through use of lightweight motors and components). In some examples, the aircraft 100 may be less than one kilogram, less than five kilograms, less than ten kilograms, and/or less than 25 kilograms.

Figure 2:
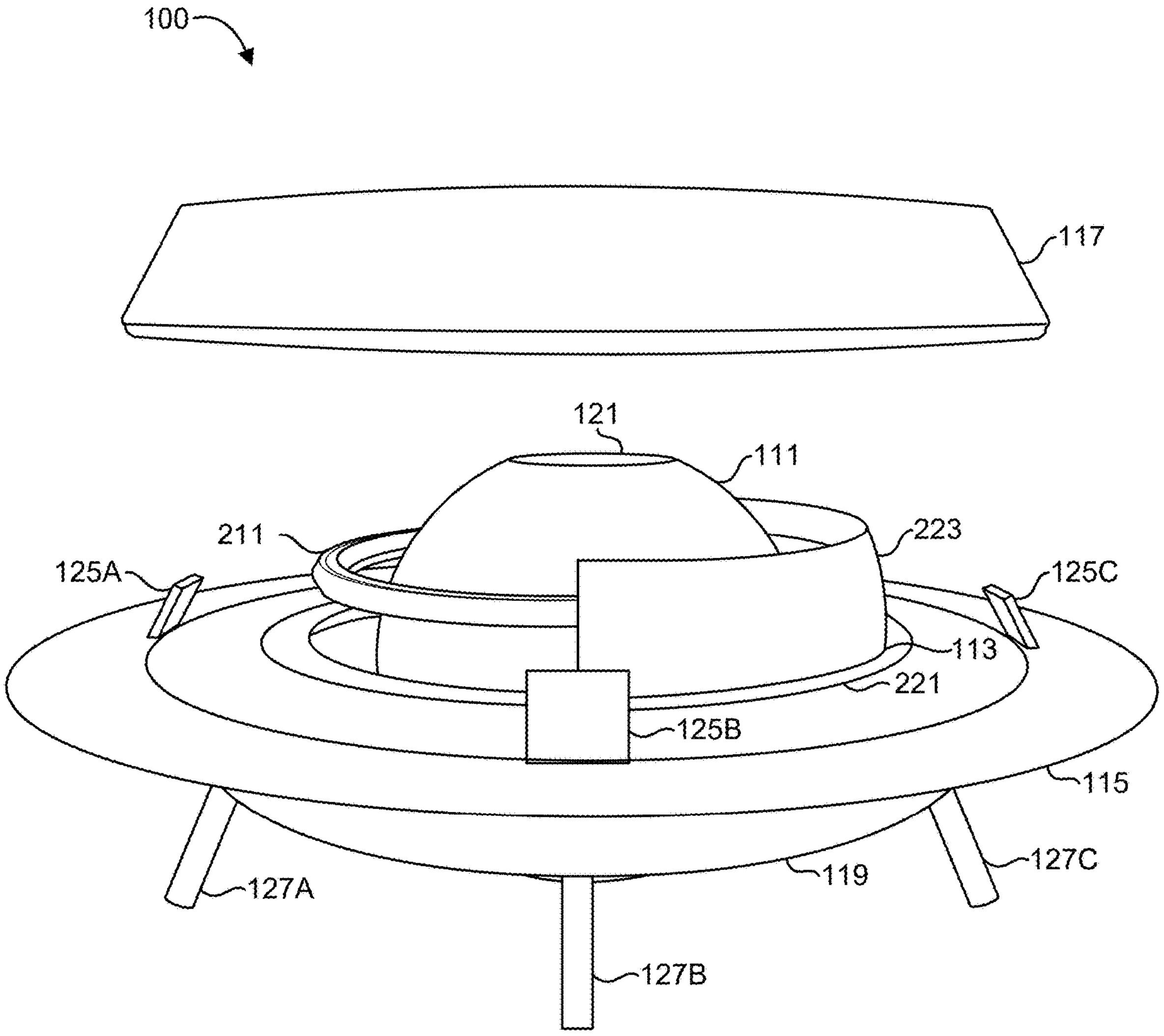
FIG. 2 illustrates an example of a disc-shaped aircraft showing a detached first cabin housing, consistent with some embodiments of the present disclosure.

FIG. 2 illustrates an example of the disc-shaped aircraft 100 showing a detached first cabin housing, consistent with some embodiments of the present disclosure. The aircraft may include one or more components of the aircraft described in connection with FIG. 1, such as the motor housing 111 with the upper opening 121 and a lower opening, the annular structure 113, the disc-shaped extension 115, the first cabin housing 117, the second cabin housing 119, elastic pieces (e.g., the elastic pieces 125A, 125B, 125C), and landing legs (e.g., the landing legs 127A, 127B, 127C). With reference to FIG. 2, the first cabin housing 117 is shown to be detached from the remainder of the aircraft. In the example of the aircraft, the annular structure 113 is shown to include a base 221 and a vertical wall 223 connected to the base 221 and extending vertically from the base 221 (e.g., upward and downward). The disc-shaped extension 115 may extend horizontally from the base 221 of the annular structure 113, in a radially outward direction. In some examples, the vertical wall 223 of the annular structure 113 may have a shape of a cylindrical shell. In the example of the aircraft, the vertical wall 223 of the annular structure 113 is shown to have a shape of a portion of a cylindrical shell (e.g., when viewed from a top-down perspective, having less than a full circle). Additionally or alternatively, the vertical wall 223 of the annular structure 113 may have any other desired shape (e.g., having a shape of an entirety or portion of a cylindrical shell that, when viewed from a top-down perspective, may have a full circle, a half of a circle, three fourths of a circle, one third of a circle, or any other desired percentage of a circle). In some examples, the vertical wall 223 may extend in both upward and downward directions from the base 221. In some examples, the vertical wall 223 may extend straight in the upward direction or in the downward direction from the base 221. Additionally or alternatively, the vertical wall 223 may extend in a curve in the upward direction or in the downward direction from the base 221. For example, the vertical wall 223 may curve towards a center vertical axis of the aircraft (extending through a middle of the upper opening 121 and lower opening 123 in the motor housing 111) as the vertical wall 223 extends in the upward direction from the base 221, and the vertical wall 223 may curve towards the center vertical axis of the aircraft as the vertical wall 223 extends in the downward direction from the base 221.

A first portion of the vertical wall 223 that may extend in the upward direction from the base 221 may be located above the base 221. A second portion of the vertical wall 223 that may extend in the downward direction from the base 221 may be located below the base 221. In some examples, the first portion of the vertical wall 223 may be symmetrical to the second portion of the vertical wall 223 with respect to the base 221. Additionally or alternatively, the first portion of the vertical wall 223 may have a shape, extension length, percentage of a circle when viewed from a top-down perspective, or other configuration that may be different from that of the second portion of the vertical wall 223.

The annular structure 113 may encircle the motor housing 111 and may be positioned around a middle section of the motor housing 111 between the upper opening 121 and the lower opening of the motor housing 111. The aircraft may include two rings attached to an inner side of the annular structure 113. A first ring 211 of the two rings is shown in the example of the aircraft in FIG. 2, while the second ring is obstructed from view in the figure. The first ring 211 may be attached to an inner side of the portion of the vertical wall 223 of the annular structure 113 that may be above the base 221. As discussed in greater detail below, the two rings may be configured to hold the motor housing 111 between the two rings and may allow the motor housing 111 to rotate relative to the two rings.

Figure 3:
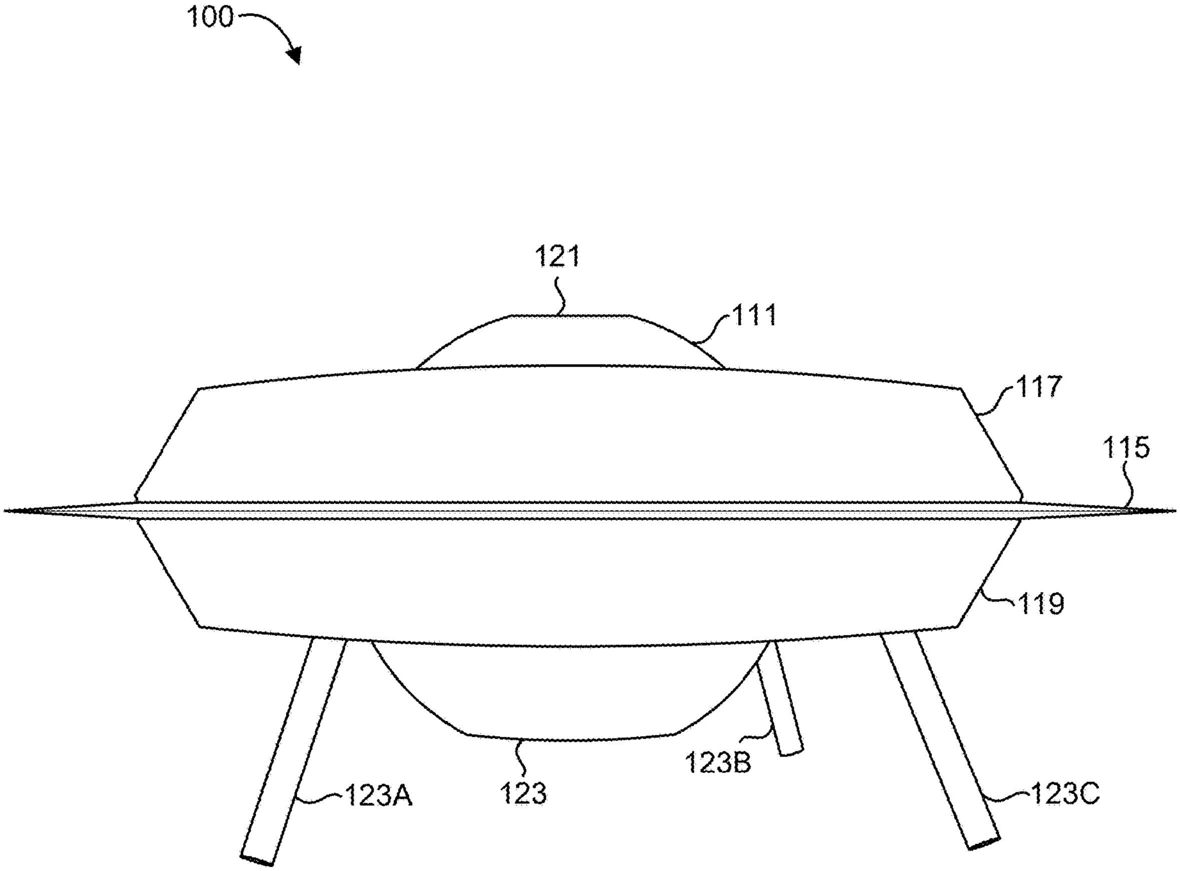
FIG. 3 illustrates an example of a disc-shaped aircraft from a side-view perspective, consistent with some embodiments of the present disclosure.

FIG. 3 illustrates an example of the disc-shaped aircraft 100 from a side-view perspective, consistent with some embodiments of the present disclosure. The aircraft may include one or more components of the aircraft described in connection with FIG. 1. With reference to FIG. 3, the motor housing 111 may have a shape of a ball with the upper opening 121 and the lower opening 123. The motor housing 111 may be encircled by the disc-shaped extension 115, the first cabin housing 117, and the second cabin housing 119. The landing legs 127A, 127B, 127C may be attached to the lower side of the second cabin housing 119. The first cabin housing 117 may be attached to the upper side of the disc-shaped extension 115. The second cabin housing 119 may be attached to the lower side of the disc-shaped extension 115.

Figure 4:
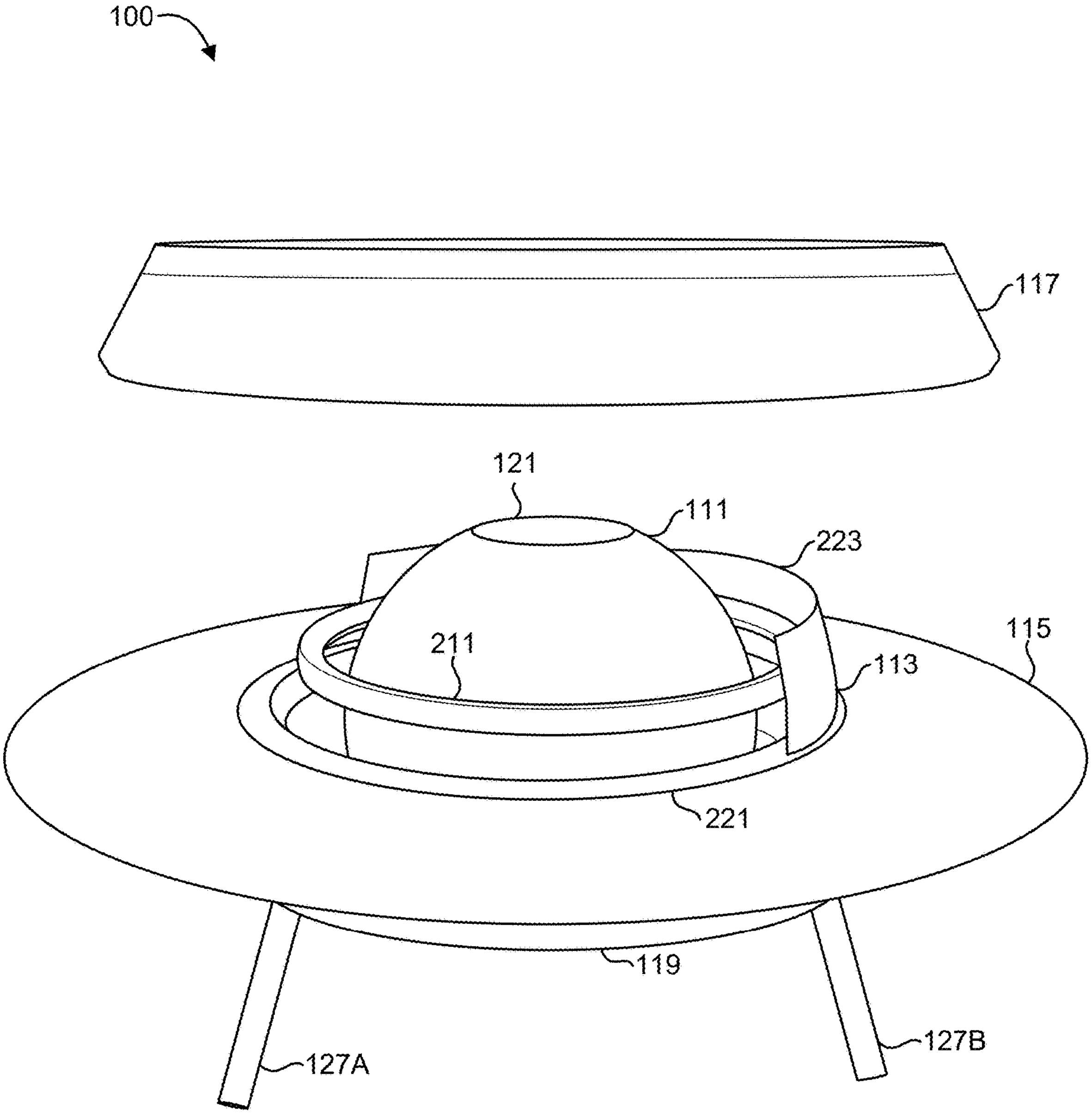
FIG. 4 illustrates an example of a disc-shaped aircraft with a detached first cabin housing, consistent with some embodiments of the present disclosure.

FIG. 4 illustrates an example of the disc-shaped aircraft 100 with a detached first cabin housing, consistent with some embodiments of the present disclosure. The aircraft may include one or more components of the aircraft described in connection with FIG. 1, such as the motor housing 111 with the upper opening 121 and a lower opening, the annular structure 113, the disc-shaped extension 115, the first cabin housing 117, the second cabin housing 119, and landing legs (e.g., the landing legs 127A, 127B). With reference to FIG. 4, the first cabin housing 117 is shown to be detached from the other components of the aircraft. In the example of the aircraft, the annular structure 113 may include the base 221 and the vertical wall 223 connected to the base 221 and extending vertically from the base 221 (e.g., upward and downward). The disc-shaped extension 115 may extend horizontally from the base 221 of the annular structure 113. The aircraft may include two rings attached to an inner side of the annular structure 113. The first ring 211 shown in this example of the aircraft may be attached to an inner side of the portion of the vertical wall 223 of the annular structure 113 that may be above the base 221.

Figure 5:
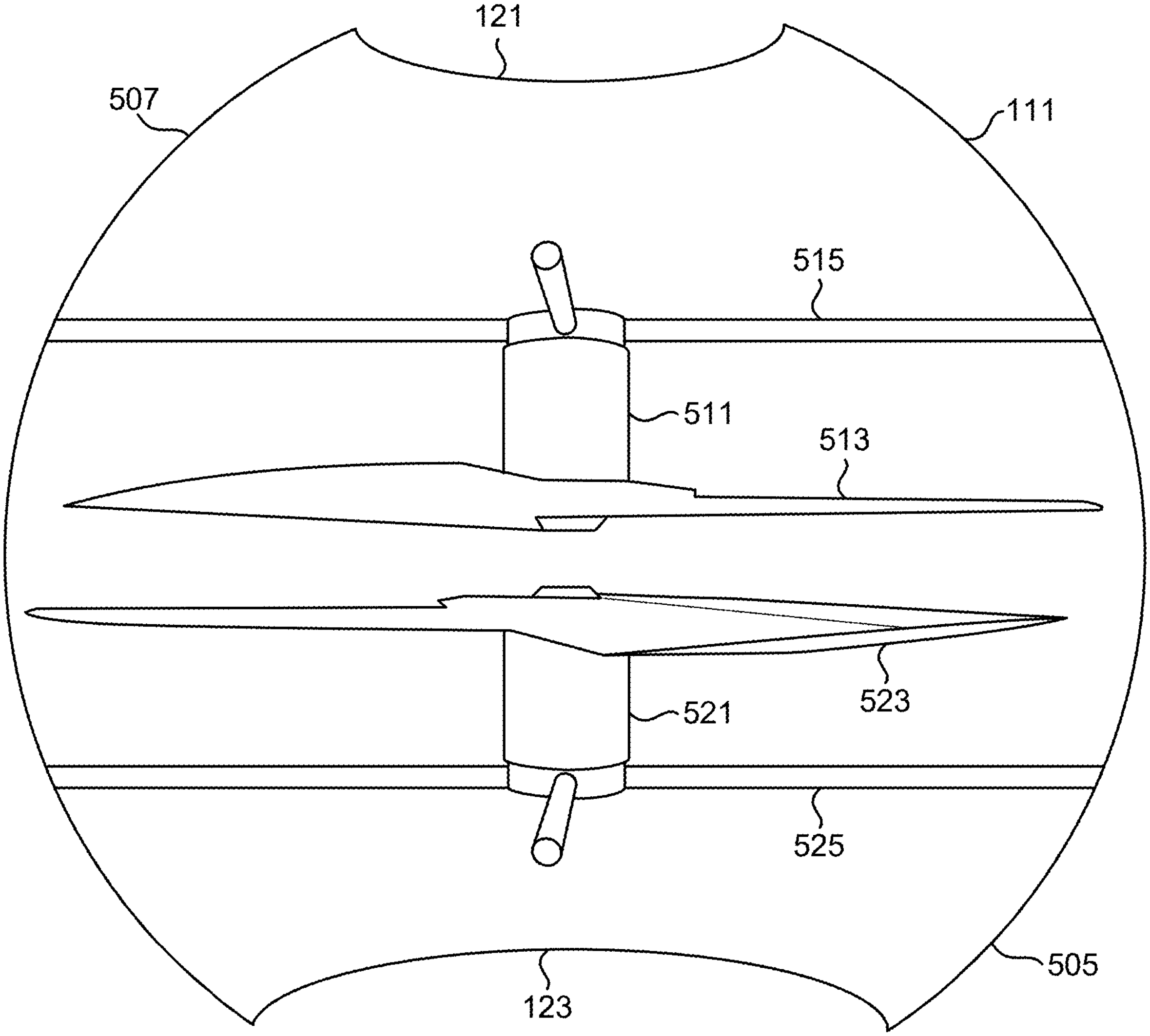
FIG. 5 illustrates an example of a motor housing from a side-view perspective, consistent with some embodiments of the present disclosure.

FIG. 5 illustrates an example of the motor housing 111 from a side-view perspective, consistent with some embodiments of the present disclosure. In FIG. 5, a half of an outer shell 505 of the motor housing 111 is removed to expose internal components housed within the motor housing 111 in the view provided. The remaining half of the outer shell 505 shown in FIG. 5 illustrates a curved surface 507 of the outer shell 505 (and, of the motor housing 111) connecting the upper opening 121 with the lower opening 123. The motor housing 111 may include electric motors. For example, the aircraft may include a first electric motor 511 that may be located within the motor housing 111. The aircraft may include, for example, a first propeller 513. The first electric motor 511 may be affixed to the motor housing 111 and may be configured to drive the first propeller 513. The aircraft may include a second electric motor 521 that may be located within the motor housing 111. The aircraft may include, for example, a second propeller 523. The second electric motor 521 may be affixed to the motor housing 111 and may be configured to drive the second propeller 523. The first electric motor 511 and the second electric motor 521 may be configured to propel air through the upper opening 121 of the motor housing 111 and the lower opening 123 of the motor housing 111. In some examples, another number of electric motors with propellers may be included in the motor housing to generate thrust (e.g., three electric motors with propellers, four electric motors with propellers, five electric motors with propellers, six electric motors with propellers, or any other desired number of electric motors with propellers).

An electric motor in the motor housing 111 (e.g., the first electric motor 511 or the second electric motor 521) may include any type of device configured to convert electrical energy into mechanical energy (e.g., in the form of rotational motion). The electric motor may be configured to provide a high power-to-weight ratio. For example, the electric motor may include a brushless motor (e.g., a brushless direct current (BLDC) motor), a brushed motor (e.g., a brushed direct current motor), a coreless motor (e.g., a hollow cup motor), an outrunner motor, an inrunner motor, or any other desired type of electric motor.

A propeller used with the electric motor in the motor housing 111 (e.g., the first propeller 513 or the second propeller 523) may include a device configured to convert rotational motion into thrust or linear force. The propeller may have any desired design or configuration suitable to generate thrust to move the aircraft of which the motor housing 111 may be a part. The propeller may be made from, for example, plastic (e.g., polycarbonate or nylon), carbon fiber, fiber-reinforced composites (e.g., nylon plus glass or carbon fiber), wood, metal, or any other suitable material. The propeller may include an aerodynamic device featuring a central hub that may secure the propeller to the shaft of the electric motor. The propeller may radiate, from the central hub, into multiple blades with a specific airfoil cross-section. A blade of the blades may have a rounded leading edge may that cut the air and a sharp trailing edge where the airflow may reunite. To have consistent lift across its length, the blade may incorporate a structural twist, transitioning from a steep angle at the root to a shallower angle at the tip to compensate for the higher rotational speeds at the outer edge.

In some examples, the first electric motor 511 may be affixed to the motor housing 111 via a first beam structure 515. The second electric motor 521 may be affixed to the motor housing 111 via a second beam structure 525. A beam structure (e.g., the first beam structure 515 or the second beam structure 525) may have a center and extending arms. In some examples, the beam structure may have a shape of a plus sign (e.g., having four extending arms from the center). Additionally or alternatively, the beam structure may have another number of extending arms (e.g., three extending arms from the center, five extending arms from the center, six extending arms from the center, or any other desired number of extending arms from the center). The terminal end of each extending arm may be affixed onto the motor housing 111. The electric motor (e.g., the electric motor 511 or the electric motor 521) may be affixed to the center of the beam structure. For example, the electric motor 511 may be affixed to the center of the beam structure 515, and the terminal ends of the extending arms of the beam structure 515 may be affixed to the motor housing 111 at the outer shell 505. The electric motor 521 may be affixed to the center of the beam structure 525, and the terminal ends of the extending arms of the beam structure 525 may be affixed to the motor housing 111 at the outer shell 505. The beam structures 515 and 525 may also be referred to as motor supports.

Additionally or alternatively, the first electric motor 511 and the second electric motor 521 may be affixed to the motor housing 111 in other suitable manners. For example, chains, nets, or other types of structures, in place of the beams, may be used to attach the electric motors to the motor housing 111. Horizontal, vertical, or angled structures (e.g., horizontal, vertical, or angled surfaces, walls, beams, chains, or nets) may be used additionally or alternatively, to attach or stabilize the electric motors to the motor housing 111.

In some examples, the first electric motor 511 may be configured to cause rotational force, to the motor housing 111, that may cancel rotational force caused by the second electric motor 521 to the motor housing 111. When an electric motor applies torque to spin a connected propeller, the propeller may exert an equal and opposite torque on the stator or stationary part of the electric motor. Because the electric motor may be affixed to the motor housing 111, the motor housing 111 may be caused to spin in the opposite direction, if the opposite torque applied to the stator or stationary part of the electric motor is not addressed. An additional electric motor may be used to cancel out the opposite torque. For example, the first electric motor 511 and the second electric motor 521 may form a pair of electric motors, and the opposite reaction torques caused by the first electric motor 511 and the second electric motor 521 to the motor housing 111 may cancel each other out. The first electric motor 511 and the second electric motor 521 may, for example, be configured to cause the first propeller 513 and the second propeller 523 to rotate in opposite directions (e.g., when looking at the motor housing 111 from a top-down perspective).

Additionally or alternatively, the first electric motor 511 and the second electric motor 521 may be positioned in the motor housing 111 in any other desired manner. For example, the first electric motor 511 and the second electric motor 521 may be aligned in the same direction (e.g., the upward direction or the downward direction), instead of facing each other as shown in FIG. 5. Based on the particular positioning of the first electric motor 511 and the second electric motor 521, the first propeller 513 and the second propeller 523 and the rotational directions of the first electric motor 511 and the second electric motor 521 may be configured accordingly to propel air in the same direction (e.g., from the upper opening 121 to the lower opening 123). For example, the angle of the blades of the first propeller 513 and the second propeller 523 may be adjusted to allow the propellers to propel air in the same direction. Additionally or alternatively, the rotational directions of the first electric motor 511 and the second electric motor 521 may be adjusted to allow the propellers to propel air in the same direction.

In some examples, a larger number (e.g., three, four, five, or any other desired number) of electric motors with propellers may be included in the motor housing 111, and the electric motors and associated propellers may be configured in such a manner that the rotational forces caused by the electric motors to the motor housing 111 may be canceled out or neutralized by the rotational forces themselves, and that the propellers may propel air in the same direction to generate thrust for the aircraft.

Figure 6:
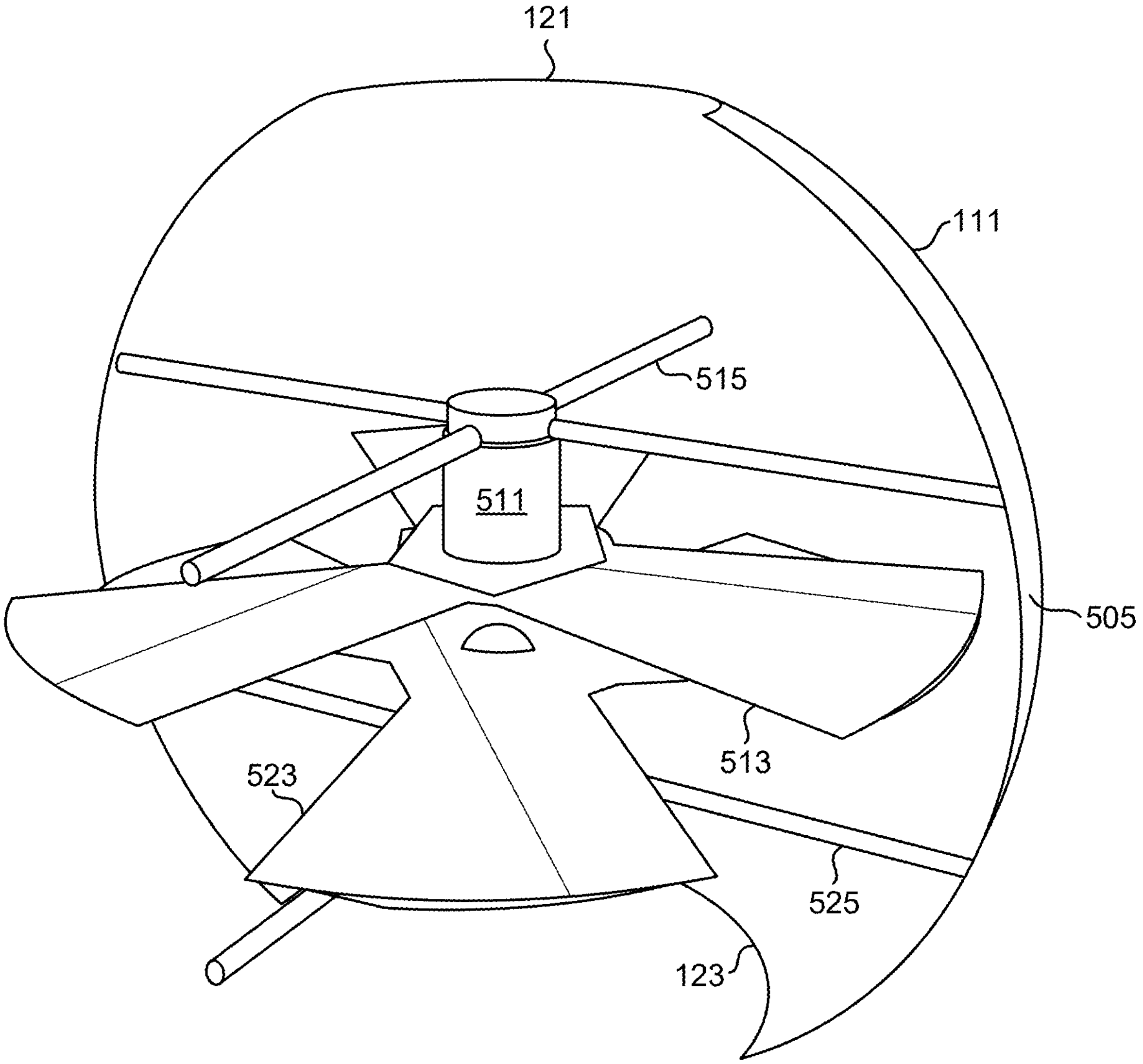
FIG. 6 illustrates an example of a motor housing from an angled perspective, consistent with some embodiments of the present disclosure.

FIG. 6 illustrates an example of the motor housing 111 from an angled perspective, consistent with some embodiments of the present disclosure. In FIG. 6 (like in FIG. 5), a half of the outer shell 505 of the motor housing 111 is removed to expose internal components housed within the motor housing 111 in the view provided. The motor housing 111 may have the upper opening 121 and the lower opening 123. The motor housing 111 may include the first electric motor 511 and a second electric motor. The first electric motor 511 may be affixed to the motor housing 111 via the first beam structure 515. The first electric motor 511 may be connected to, and configured to drive, the first propeller 513. The second electric motor may be affixed to the motor housing 111 via the second beam structure 525. The second electric motor may be connected to, and configured to drive, the second propeller 523. The motor housing 111 is shown in FIG. 6 to include less than its entire surface for purposes of illustration only. It is understood that the surface of the motor housing 111 may be a sphere or have a shape of a ball, with an upper opening and a lower opening.

Figure 7:
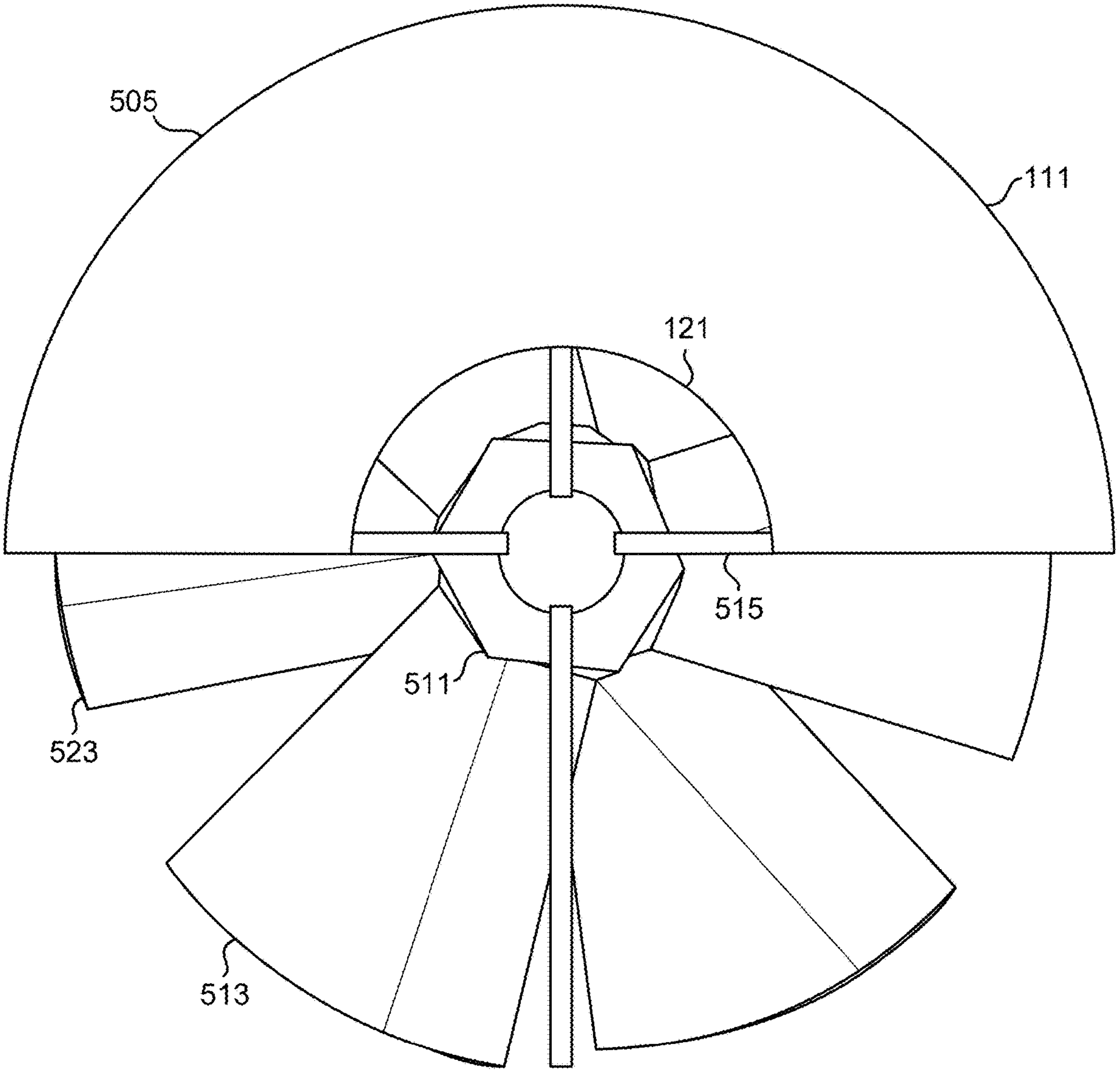
FIG. 7 illustrates an example of a motor housing from a top-down perspective, consistent with some embodiments of the present disclosure.

FIG. 7 illustrates an example of the motor housing 111 from a top-down perspective, consistent with some embodiments of the present disclosure. In FIG. 7 (like in FIG. 5), a half of the outer shell 505 of the motor housing 111 is removed to expose internal components housed within the motor housing 111 in the view provided. The motor housing 111 may have the upper opening 121 and a lower opening. The motor housing 111 may include the first electric motor 511 and a second electric motor. The first electric motor 511 may be affixed to the motor housing 111 via the first beam structure 515. The first electric motor 511 may be connected to, and configured to drive, the first propeller 513. The second electric motor may be affixed to the motor housing 111 via a second beam structure. The second electric motor may be connected to, and configured to drive, the second propeller 523. The motor housing 111 is shown in FIG. 7 to include approximately a half of its entire surface for purposes of illustration only. It is understood that the surface of the motor housing 111 may be a sphere or have a shape of a ball, with an upper opening and a lower opening.

Figure 8:
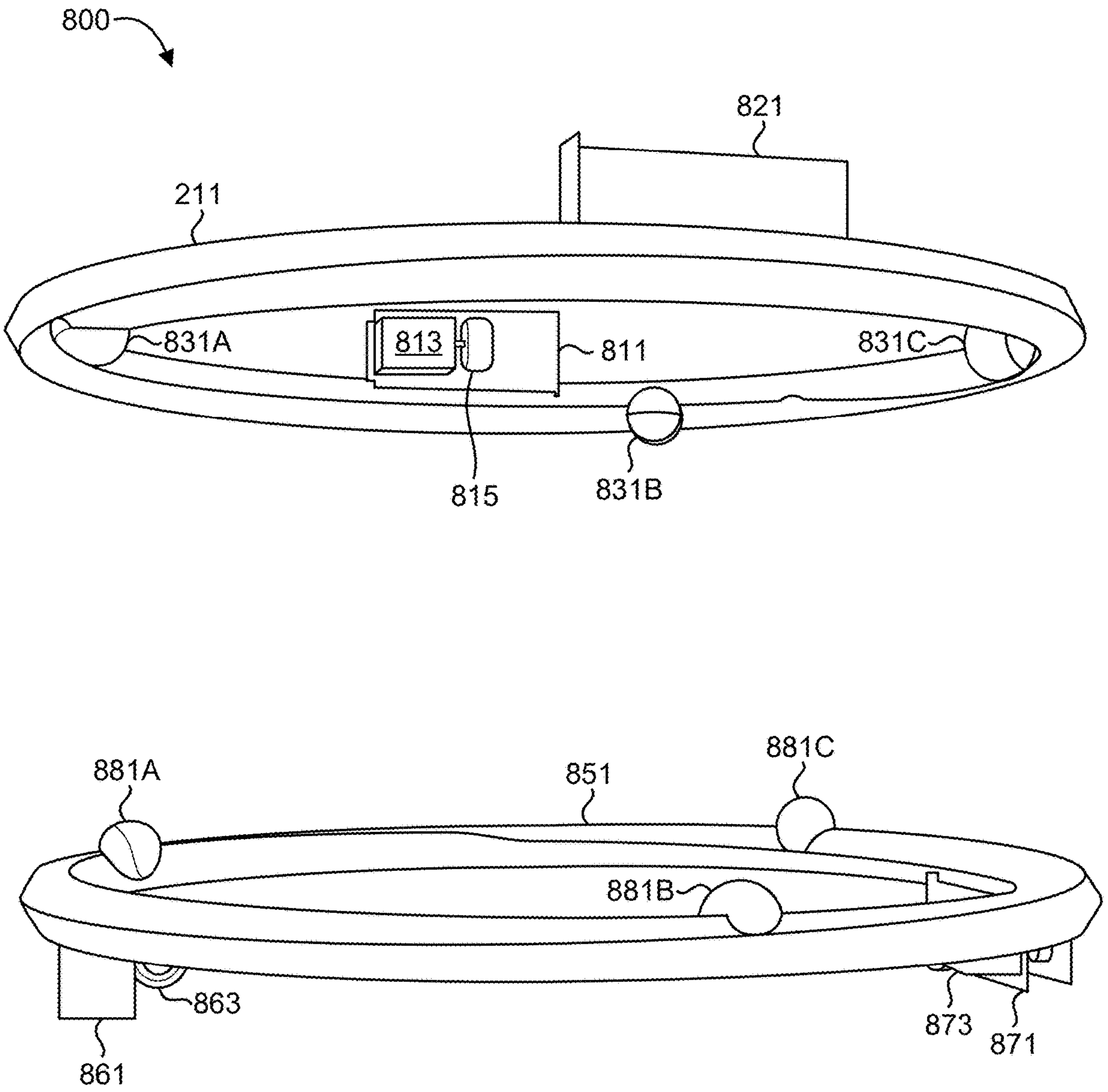
FIG. 8 illustrates an example of a rotational mechanism for a motor housing, consistent with some embodiments of the present disclosure.

FIG. 8 illustrates an example of a rotational mechanism for a motor housing, consistent with some embodiments of the present disclosure. The aircraft 100 may include a rotational mechanism 800 to rotate the motor housing (and/or the components in the motor housing) relative to the remainder of the aircraft. The rotational mechanism 800 may include, for example, electric motors configured to rotate the motor housing 111 with respect to the annular structure 113 (see, e.g., FIGS. 1-4). The rotational mechanism 800 may be facilitated by two or more rings of the aircraft 100 configured to hold the motor housing 111. For example, the aircraft 100 may include the first ring 211 attached to an inner side of the annular structure 113 (see also, e.g., FIG. 2 and FIG. 17). The aircraft 100 may include a second ring 851 attached to the inner side of the annular structure 113 (see also, e.g., FIG. 17). For example, the first ring 211 may be attached to the inner side of the portion of the vertical wall 223 of the annular structure 113 that may be positioned above the base 221. The second ring 851 may be attached to the inner side of the portion of the vertical wall 223 of the annular structure 113 that may be positioned below the base 221.

Figure 17:
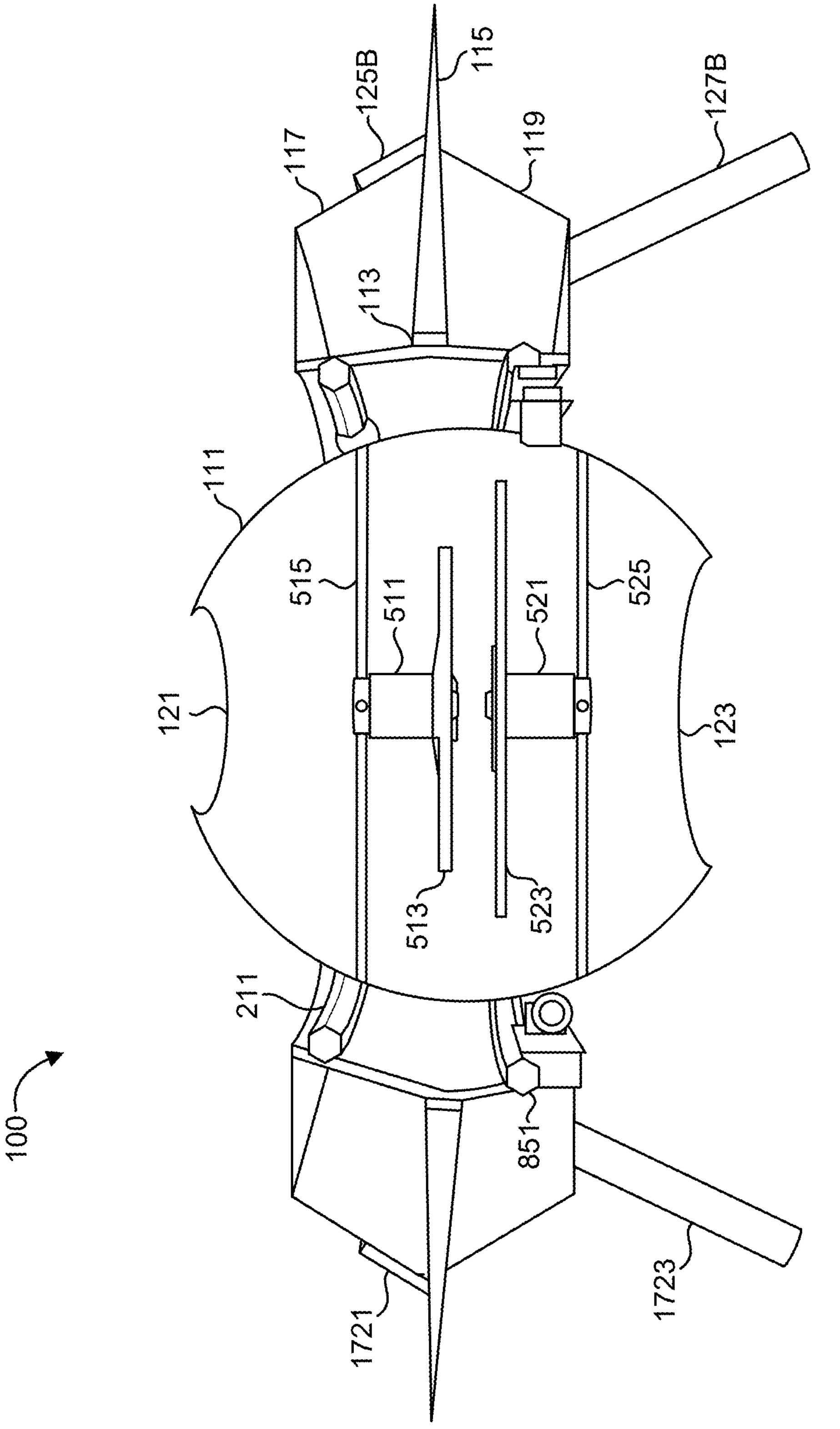
FIG. 17 illustrates a cross-sectional profile view of an example of a disc-shaped aircraft, consistent with some embodiments of the present disclosure.

With reference to FIG. 8 and also to FIG. 17, the first ring 211 and the second ring 851 may be configured to hold the motor housing 111, with the first ring 211 encircling an upper section of the motor housing 111 and with the second ring 851 encircling a lower section of the motor housing 111. In some examples, a diameter of the first ring 211 may be smaller than a diameter of the motor housing 111, and a diameter of the second ring 851 may be smaller than the diameter of the motor housing 111. This configuration of the first ring 211 and the second ring 851 may allow the motor housing 111 to be held between the two rings and may prevent the motor housing 111 from coming out of the restrictions by the two rings. The first ring 211 may restrict the motor housing 111 on an upper side of the motor housing 111, and the second ring 851 may restrict the motor housing 111 on a lower side of the motor housing 111.

In some examples, the motor housing 111 may be rotatably coupled to the first ring 211 and the second ring 851. When the motor housing 111 is held between the first ring 211 and the second ring 851, the motor housing 111 may have limited or no translational movement relative to the first ring 211 and the second ring 851 in any direction in the three-dimensional space, but may have rotational movement or change in orientation relative to the first ring 211 and the second ring 851. In some examples, the first ring 211 and the second ring 851 (and/or parts or components of or associated with the first ring 211 and the second ring 851) may be in contact with the motor housing 111, and may slide on the outer surface of the motor housing 111 when the motor housing 111 rotates relative to the first ring 211 and the second ring 851.

In some examples, the first ring 211 may have at least three bearing balls (e.g., bearing balls 831A, 831B, 831C) placed on an inner side of the first ring 211. The second ring 851 may have at least three bearing balls (e.g., bearing balls 881A, 881B, 881C) placed on an inner side of the second ring 851. The bearing balls may be made from any desired material, such as steel, ceramic, plastic, or any other suitable material. The at least three bearing balls of the first ring 211 and the at least three bearing balls of the second ring 851 may be configured to be in contact with the motor housing 111, and may allow rotational movement of the motor housing 111 with respect to the first ring 211 and the second ring 851. The first ring 211 and the second ring 851 may have pockets or bearing retainers that may receive the bearing balls. A bearing ball may be partially embedded in a corresponding pocket. The portion of the bearing ball that may be remaining outside of the pocket may be configured to be in contact with the outer surface of the motor housing 111. Additionally or alternatively, the first ring 211 and/or the second ring 851 may have an annular groove or a bearing raceway in which the bearing balls may be placed or partially embedded. The portion of each bearing ball that may be remaining outside of the annular groove or the bearing raceway may be configured to be in contact with the outer surface of the motor housing 111. In some examples, a larger number of bearing balls may be used as desired for the first ring 211 or the second ring 851. Additionally or alternatively, other bearing mechanism may be used as desired for the first ring 211 or the second ring 851, to allow the motor housing 111 to be held between the first ring 211 and the second ring 851, and to allow the motor housing 111 to rotate relative to the first ring 211 and the second ring 851. When the bearing balls or other suitable mechanisms are used, the diameter of the circle as defined by the intended contact points, of the bearing balls (or other suitable mechanisms) of each of the first ring 211 and the second ring 851, to the motor housing 111 is configured to be smaller than the diameter of the motor housing 111, so that the first ring 211 and the second ring 851 with the bearing balls (or other suitable mechanisms) may restrict the motor housing 111 between the first ring 211 and the second ring 851.

The aircraft 100 may include a third electric motor configured to drive a first friction ring to rotate the motor housing about a first axis when the first friction ring is engaged with the motor housing. The third electric motor may include any type of device configured to convert electrical energy into mechanical energy (e.g., in the form of rotational motion). For example, the third electric motor may include a brushless motor (e.g., a brushless direct current (BLDC) motor), a brushed motor (e.g., a brushed direct current motor), a coreless motor (e.g., a hollow cup motor), a servo motor, an outrunner motor, an inrunner motor, or any other desired type of electric motor. In some examples, the first friction ring may include a rubber ring. Additionally or alternatively, the first friction ring may be made from other suitable materials.

The aircraft 100 may include a first motor engagement mechanism including a first actuator that may be configured to move a location of the third electric motor to cause the first friction ring to selectively contact and disengage from the motor housing. The first motor engagement mechanism may include any type of device or structure configured to use the first actuator to move the location of an electric motor. The first actuator may include, for example, any device or machine component configured to move or control a mechanism or system, converting various forms of energy (such as electrical, magnetic, hydraulic, or pneumatic) into physical or mechanical motion. In some examples, the first actuator may include a pair of an electromagnet and a permanent magnet, and the repelling force between the electromagnet and the permanent magnet when the electromagnet is activated may cause physical or mechanical movement, as described in greater detail below.

With reference to FIG. 8, for example, a third electric motor 813 (e.g., attached to a first motor engagement mechanism 811) may be configured to drive a first friction ring 815 to rotate the motor housing 111 about a first axis when the first friction ring 815 is engaged with the motor housing 111. The first motor engagement mechanism 811 may include a first actuator that may be configured to move a location of the third electric motor 813 to cause the first friction ring 815 to selectively contact and disengage from the motor housing 111. The first friction ring 815 may be an example of a rotatable driver or roller. In other examples, a different rotatable driver or roller may be employed.

Figure 9:
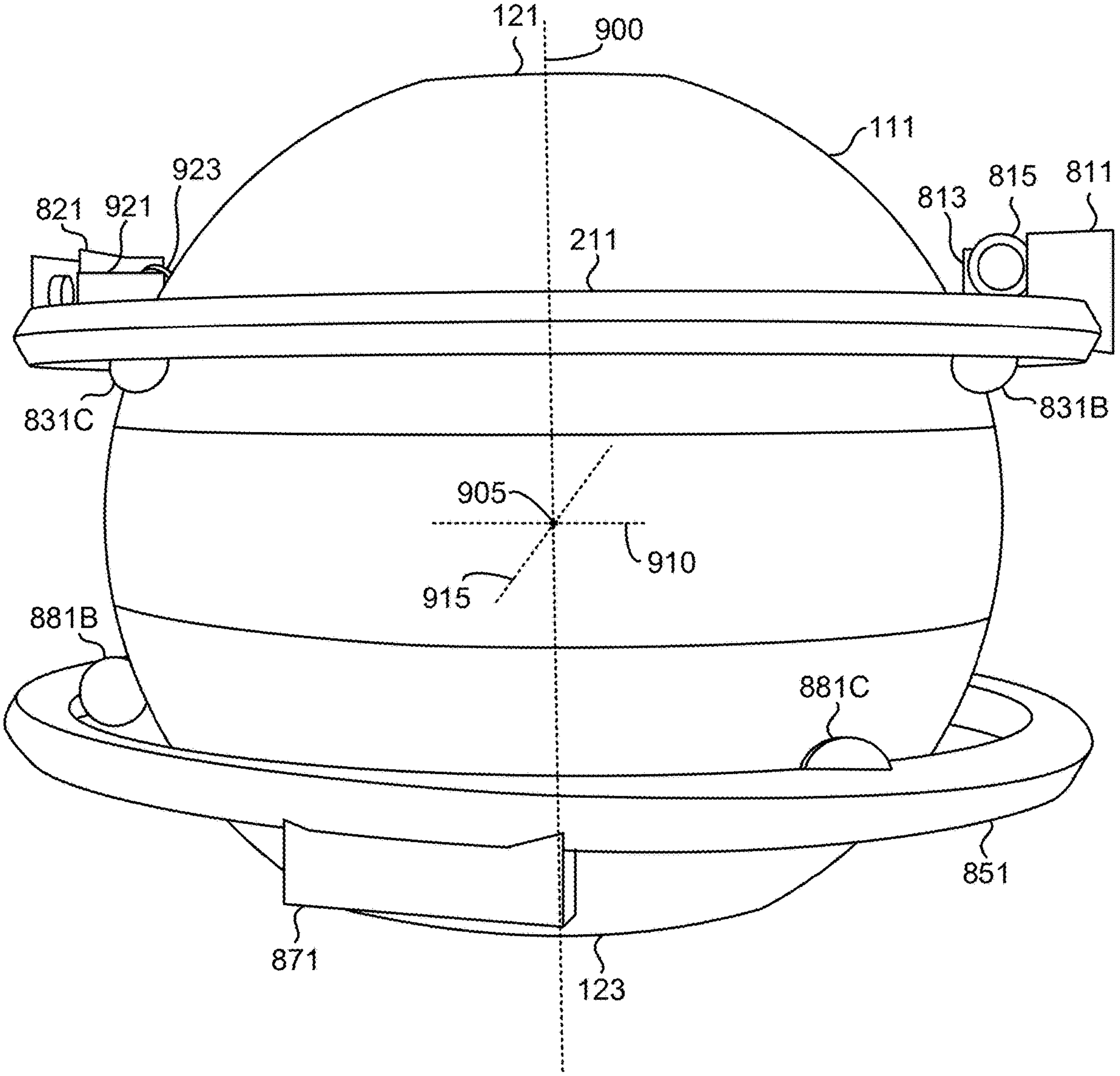
FIG. 9 illustrates an example of a rotational mechanism showing a motor housing from a side-view perspective, consistent with some embodiments of the present disclosure.

FIG. 9 illustrates an example of a rotational mechanism showing a motor housing from a side-view perspective, consistent with some embodiments of the present disclosure. As shown in FIG. 9, the motor housing 111 may be held between the first ring 211 and the second ring 851 and may be rotatably coupled to the first ring 211 and the second ring 851 (e.g., via bearing balls such as 831B, 831C, 881B, 881C). The third electric motor 813 (e.g., attached to the first motor engagement mechanism 811) may be configured to drive the first friction ring 815 to rotate the motor housing 111 about a first axis when the first friction ring 815 is engaged with the motor housing 111. The first motor engagement mechanism 811 may include a first actuator that may be configured to move a location of the third electric motor 813 to cause the first friction ring 815 to selectively contact (engage) and disengage from the motor housing 111.

Figure 10:
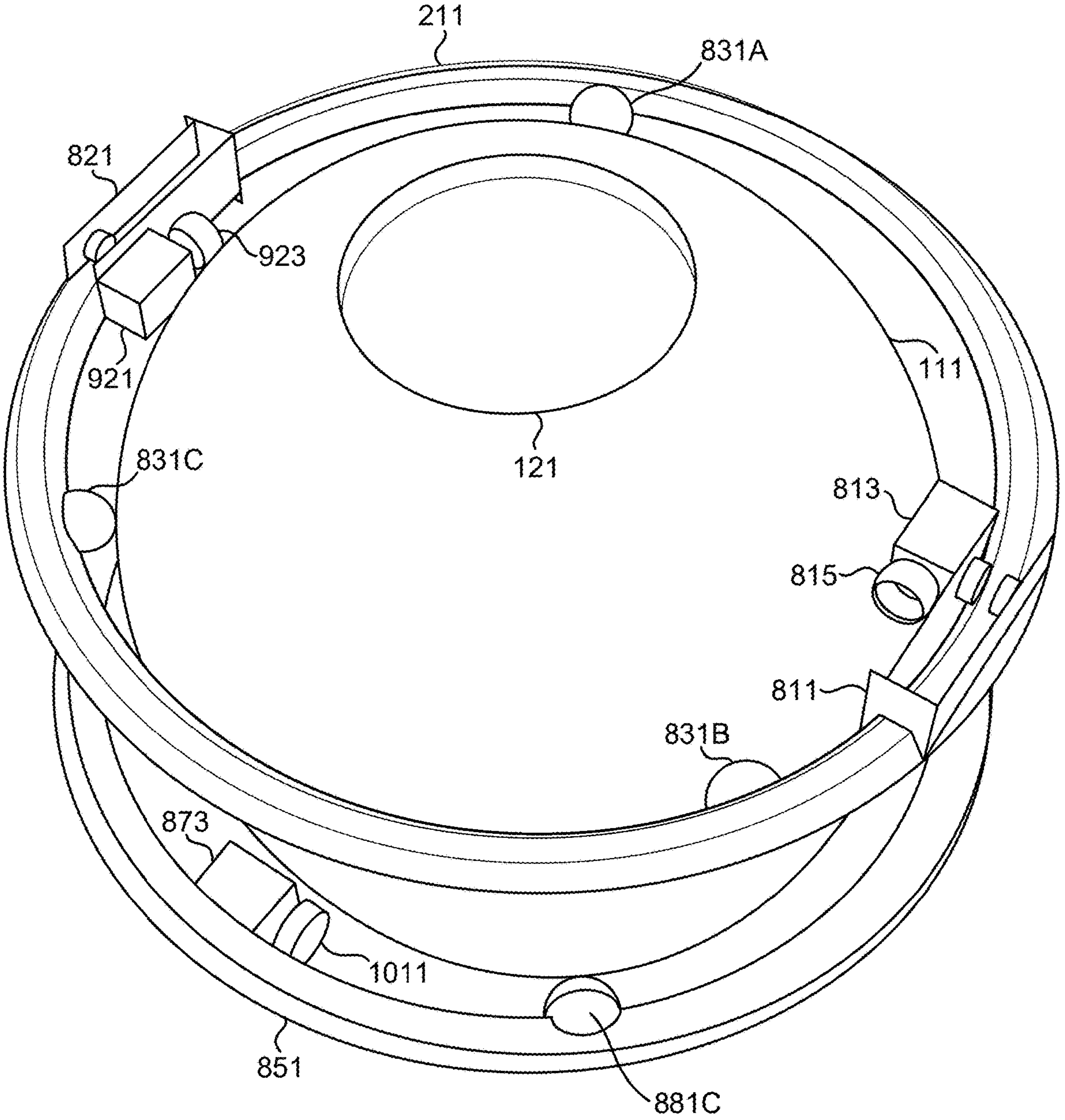
FIG. 10 illustrates an example of a rotational mechanism showing a motor housing from an angled perspective, consistent with some embodiments of the present disclosure.

FIG. 10 illustrates an example of a rotational mechanism showing a motor housing from an angled perspective, consistent with some embodiments of the present disclosure. As shown in FIG. 10, the motor housing 111 may be held between the first ring 211 and the second ring 851 and may be rotatably coupled to the first ring 211 and the second ring 851 (e.g., via bearing balls such as 831A, 831B, 831C, 881C). The third electric motor 813 (e.g., attached to the first motor engagement mechanism 811) may be configured to drive the first friction ring 815 to rotate the motor housing 111 about a first axis when the first friction ring 815 is engaged with the motor housing 111. The first motor engagement mechanism 811 may include a first actuator that may be configured to move a location of the third electric motor 813 to cause the first friction ring 815 to selectively contact and disengage from the motor housing 111.

Figure 11:
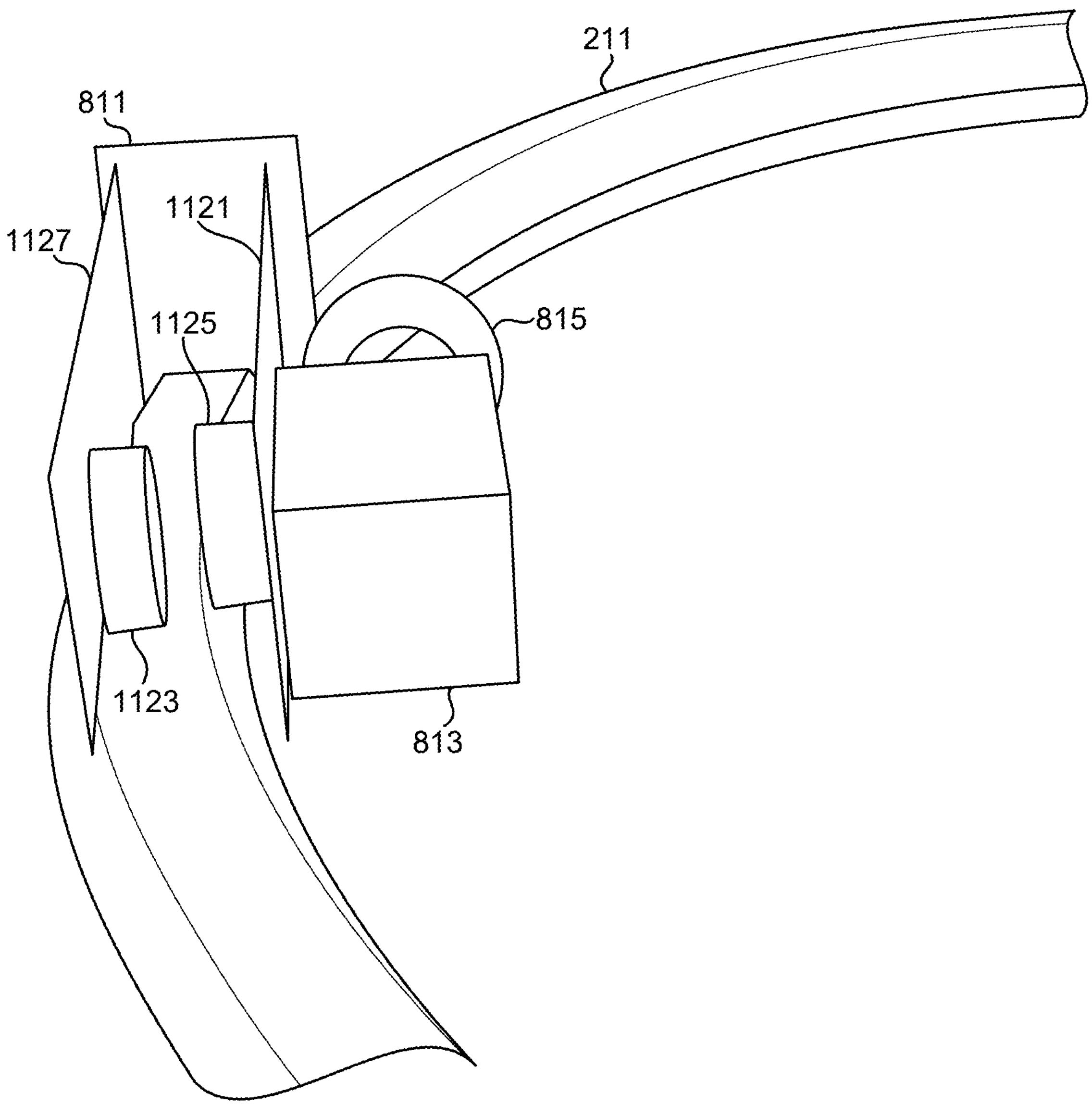
FIG. 11 illustrates an example of a motor engagement mechanism from an angled perspective, consistent with some embodiments of the present disclosure.

FIG. 11 illustrates an example of a motor engagement mechanism from an angled perspective, consistent with some embodiments of the present disclosure. As shown in FIG. 11, for example, the first motor engagement mechanism 811 may include an elastic arm 1121. A first terminal section of the elastic arm may be rotationally fixed with respect to the first ring 211. The third electric motor 813 may be attached to a first side of a second terminal section of the elastic arm 1121. An electromagnet 1125 may be attached to a second side of the second terminal section of the elastic arm 1121. The elastic arm 1121 may include, for example, an elastic metal sheet, or may be made from any other suitable material.

In some examples, the first motor engagement mechanism 811 may include a U-shaped metal piece including the elastic arm 1121. The U-shaped metal piece may be made from any suitable material, such as iron, steel, copper alloys, or any other suitable material. The electromagnet 1125 may be placed relative to a permanent magnet 1123 that may be rotationally fixed with respect to the first ring 211. For example, a second arm 1127 of the U-shaped metal piece, and the middle part of the U-shaped metal piece between the elastic arm 1121 and the second arm 1127, may be planted into, affixed to, and/or attached to, the first ring 211. The permanent magnet 1123 may be affixed to a side of the second arm 1127 and may be in a position facing the electromagnet 1125 (e.g., directly). The first terminal section of the elastic arm 1121 may be integrally connected to, or affixed to, the middle part of the U-shaped metal piece, with the remaining portion of the elastic arm 1121 positioned in the nearby space and being able to change shape elastically. An activation of the electromagnet 1125 may cause a positional movement of the third electric motor 813 and cause the first friction ring 815 to be in contact with the motor housing 111. For example, the activation of the electromagnet 1125 may cause the electromagnet 1125 and the permanent magnet 1123 to repel each other, and the repelling force may cause the third electric motor 813 together with the first friction ring 815 to move towards the motor housing 111, so that the first friction ring 815 may become in contact with the motor housing 111. Conversely, deactivation of the electromagnet 1125 may cause the elastic arm 1121 to return to its default or natural state so that the first friction ring 815 may disengage from the motor housing 111.

Figure 12:
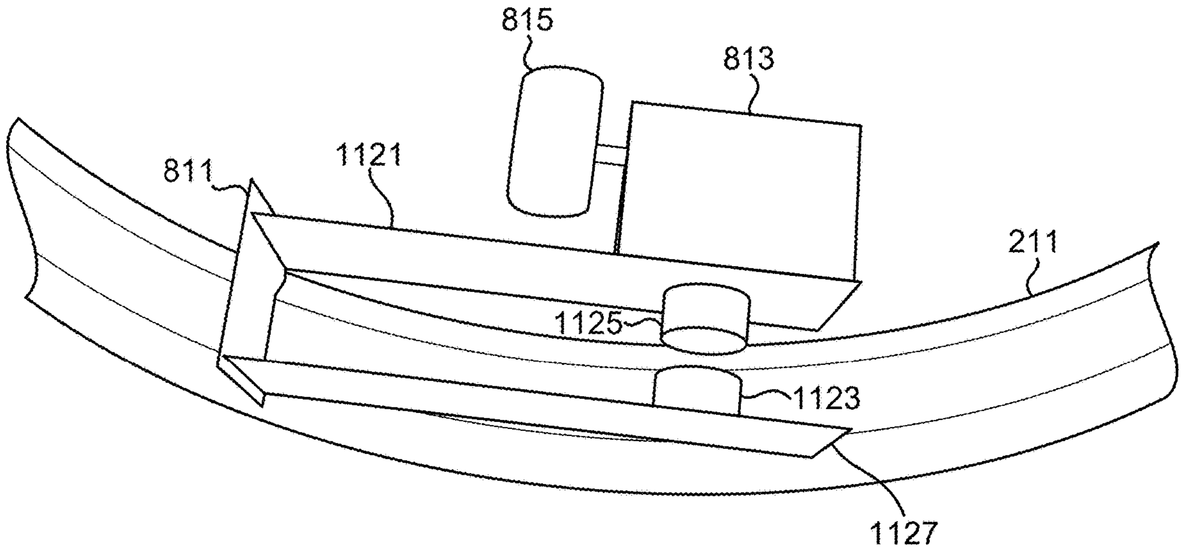
FIG. 12 illustrates an example of a motor engagement mechanism from a top-down perspective, consistent with some embodiments of the present disclosure.

FIG. 12 illustrates an example of a motor engagement mechanism from a top-down perspective, consistent with some embodiments of the present disclosure. FIG. 12 may illustrate, from a top-down perspective, the first motor engagement mechanism 811 described in connection with FIG. 11. The electromagnet 1125 and the permanent magnet 1123 may repel each other, when the electromagnet 1125 is activated. The first motor engagement mechanism 811 may be configured to cause the third electric motor 813, and the first friction ring 815 secured to the shaft of the third electric motor 813, to selectively move towards the motor housing 111, so that the first friction ring 815 may become in contact with the motor housing 111. Conversely, deactivation of the electromagnet 1125 may cause the elastic arm 1121 to return to its default or natural state so that the first friction ring 815 may disengage from the motor housing 111. Accordingly, by controlling the electromagnet 1125, the third electric motor 813 and the first friction ring 815 may be selectively controlled to engage and disengage the motor housing 111 (e.g., at an outer surface of the outer shell 505 of the motor housing 111).

Figure 13:
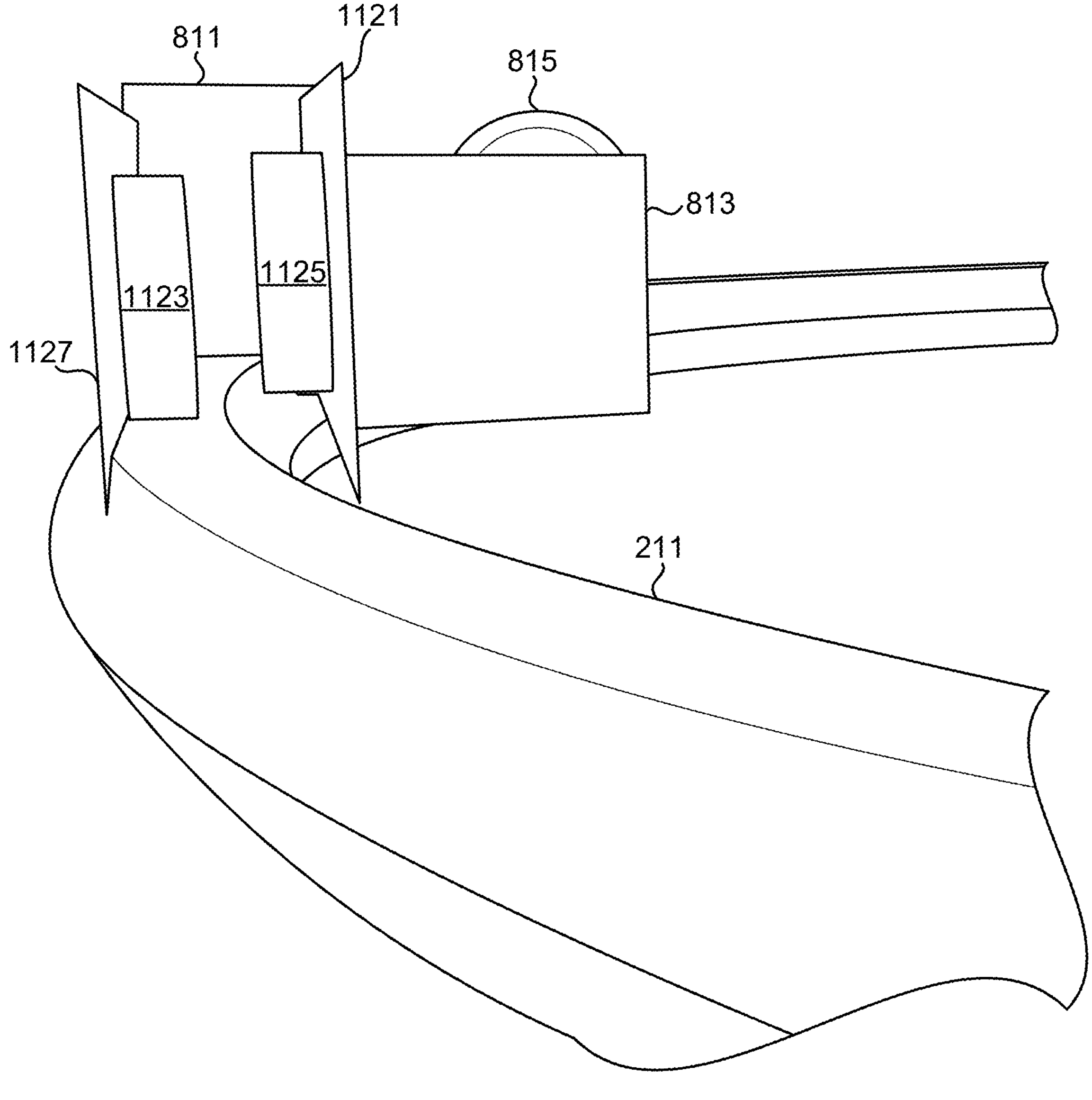
FIG. 13 illustrates an example of a motor engagement mechanism from a side-view perspective, consistent with some embodiments of the present disclosure.

FIG. 13 illustrates an example of a motor engagement mechanism from a side-view perspective, consistent with some embodiments of the present disclosure. FIG. 13 may illustrate, from a side-view perspective, the first motor engagement mechanism 811 described in connection with FIG. 11. The electromagnet 1125 and the permanent magnet 1123 may repel each other, when the electromagnet 1125 is activated. The first motor engagement mechanism 811 may be configured to cause the third electric motor 813, and the first friction ring 815 secured to the shaft of the third electric motor 813, to selectively move towards the motor housing 111, so that the first friction ring 815 may become in contact with the motor housing 111.

The aircraft 100 may include a fourth electric motor configured to drive a second friction ring to rotate the motor housing about a second axis when the second friction ring is engaged with the motor housing. The fourth electric motor may have a configuration same as or similar to the third electric motor. The fourth electric motor may be attached to a second motor engagement mechanism. The second motor engagement mechanism may include a second actuator that may be configured to move a location of the fourth electric motor to cause the second friction ring to selectively contact and disengage from the motor housing. The second motor engagement mechanism may have a configuration same as or similar to the first motor engagement mechanism. In some examples, the second friction ring may include a rubber ring. Additionally or alternatively, the second friction ring may have a configuration same as or similar to the first friction ring. With reference to FIG. 8, for example, a fourth electric motor 873 may be attached to a second motor engagement mechanism 871. A portion of the second motor engagement mechanism 871 may be planted into, affixed to, and/or attached to, the second ring 851. With reference to FIG. 9, for example, the second motor engagement mechanism 871 is further illustrated from a side-view perspective. With reference to FIG. 10, for example, the fourth electric motor 873 may be configured to drive a second friction ring 1011 to rotate the motor housing 111 about the second axis when the second friction ring 1011 is engaged with the motor housing 111. The second friction ring 1011 may be secured to the shaft of the fourth electric motor 873. The second motor engagement mechanism 871 may be configured similarly to the first motor engagement mechanism 811 and, thus, may be similarly operable, through control of an electromagnet of the second motor engagement mechanism 871, to cause the fourth electric motor 873 and the second friction ring 1011 to selectively engage with and disengage from the motor housing 111 (e.g., at the outer surface of the outer shell 505 of the motor housing 111).

In some examples, the first axis may be perpendicular to the second axis. This configuration may allow the motor housing to rotate efficiently and effectively in orthogonal directions. For example, with reference to FIG. 9, a z-axis 900 may extend through the upper opening 121 and lower opening 123 through a center of the motor housing 111. A center point 905 of the motor housing 111 may define an intersection of an x-axis 910 and a y-axis 915, where the z-axis, x-axis, and y-axis may be orthogonal to one another. Driving the first friction ring 815 may cause rotation of the motor housing 111 about the y-axis 915. Driving the second friction ring 1011 may cause rotation of the motor housing 111 about the x-axis 910. Additionally or alternatively, the rotational mechanism for the motor housing may be configured in such a manner that the first axis may be oblique to the second axis at any desired angle (e.g., 80 degrees, 70 degrees, 60 degrees, or any other desired number of degrees).

In some examples, the aircraft 100 may include a fifth electric motor configured to facilitate rotation of the motor housing about the first axis. The fifth electric motor may have a configuration same as or similar to the third electric motor. The fifth electric motor may be placed at a different location from the third electric motor but may be aligned with the third electric motor so that both of them may be configured to cause rotational movement of the motor housing about the first axis and to reduce or avoid conflicting rotational forces applied by them to the motor housing. Like the third electric motor, the fifth electric motor may be attached to a motor engagement mechanism. With reference to FIG. 8, for example, the fifth electric motor may be attached to a motor engagement mechanism 821, a portion of which may be planted into, affixed to, and/or attached to, the first ring 211. With reference to FIG. 9, for example, a fifth electric motor 921 may be attached to the motor engagement mechanism 821 and may be configured to drive a friction ring 923 to rotate the motor housing 111 about the first axis when the friction ring 923 is engaged with the motor housing 111. The motor engagement mechanism 821 may have a configuration that is the same as or similar to the first motor engagement mechanism 811 and may include an actuator that may be configured to move a location of the fifth electric motor 921 to cause the friction ring 923 to selectively contact and disengage from the motor housing 111. The friction ring 923 may have a configuration that is the same as or similar to the first friction ring 815. With reference to FIG. 10, for example, the fifth electric motor 921, the motor engagement mechanism 821, and the friction ring 923 are further illustrated from an angled perspective. As shown in FIG. 10, the third electric motor 813 and the fifth electric motor 921 may be aligned with each other to rotate the motor housing 111 about the first axis when the friction rings 815, 923 are engaged with the motor housing 111.

In some examples, a sixth electric motor configured to facilitate rotation of the motor housing about the second axis. The sixth electric motor may have a configuration same as or similar to the third electric motor. The sixth electric motor may be placed at a different location from the fourth electric motor but may be aligned with the fourth electric motor so that both of them may be configured to cause rotational movement of the motor housing about the second axis and to reduce or avoid conflicting rotational forces applied by them to the motor housing. Like the fourth electric motor, the sixth electric motor may be attached to a motor engagement mechanism. With reference to FIG. 8, for example, the sixth electric motor may be attached to a motor engagement mechanism 861, a portion of which may be planted into, affixed to, and/or attached to, the second ring 851. The sixth electric motor may be configured to drive a friction ring 863, which may be secured to the shaft of the sixth electric motor. The sixth electric motor may be attached to the motor engagement mechanism 861 and may be configured to drive the friction ring 863 to rotate the motor housing 111 about the second axis when the friction ring 863 is engaged with the motor housing 111. The motor engagement mechanism 861 may have a configuration same as or similar to the first motor engagement mechanism 811 and may include an actuator that may be configured to move a location of the sixth electric motor to cause the friction ring 863 to selectively contact and disengage from the motor housing 111. The friction ring 863 may have a configuration same as or similar to the first friction ring 815. The fourth electric motor 873 and the sixth electric motor may be aligned with each other to rotate the motor housing 111 about the second axis when the friction ring of the fourth electric motor 873 and the friction ring 863 are engaged with the motor housing 111.

In some examples, other electric motors may be used in addition to or as an alternative to the third, fourth, fifth, and sixth electric motors, to facilitate the rotational movement of the motor housing. For example, another set of one or more electric motors (e.g., with their respective friction rings and motor engagement mechanisms) may be configured to cause the motor housing to rotate about a third axis different from the first axis or the second axis, when their friction rings are engaged with the motor housing. In some examples, to avoid conflicting or interfering forces that may be caused to the motor housing by the different sets of electric motor(s) rotating the motor housing about the first axis, the second axis, and/or any other axis, the associated motor engagement mechanisms may be selectively activated (e.g., in groups). For example, when one set of the different sets of electric motor(s) (e.g., associated with rotating the motor housing 111 about one axis) has its associated friction ring(s) engaged with the motor housing to rotate the motor housing during a particular time, the other set or sets of electric motor(s) (e.g., associated with rotating the motor housing 111 about a different axis) may have its or their associated friction ring(s) disengaged or detached from the motor housing during the particular time. In some examples, it may be configured to have two or more sets of electric motor(s) to engage with the motor housing using friction rings and apply rotational forces to the motor housing at the same time, although possible slipping movement or abrasion may be caused to the friction rings and/or the motor housing.

Additionally or alternatively, the aircraft 100 may include a mechanism to prevent rotation of the motor housing when the motor housing has been rotated by a particular angle from an original orientation. For example, the motoring housing may have a raised line surrounding and encircling its upper opening or lower opening, and the raised line may prevent further rotation of the motor housing when the raised line has been reached (e.g., by the rotational mechanism such as the friction rings or electric motors). Additionally or alternatively, a limit may be set in the control program for controlling the rotation of the motor housing, to configure the amount of allowed rotation of the motor housing.

Although a particular mechanism has been illustrated and described with respect to the first motor engagement mechanism 811, in other examples, the first motor engagement mechanism 811 (and/or the other motor engagement mechanisms described herein) may include a different mechanism to selectively engage and disengage the respective motors with the motor housing 111. For example, the motor engagement mechanisms may include a linear actuator to linearly move a corresponding motor to engage and disengage with the motor housing 111 or may include a rotating actuator to pivot a corresponding motor to engage and disengage with the motor housing 111.

Figure 14:
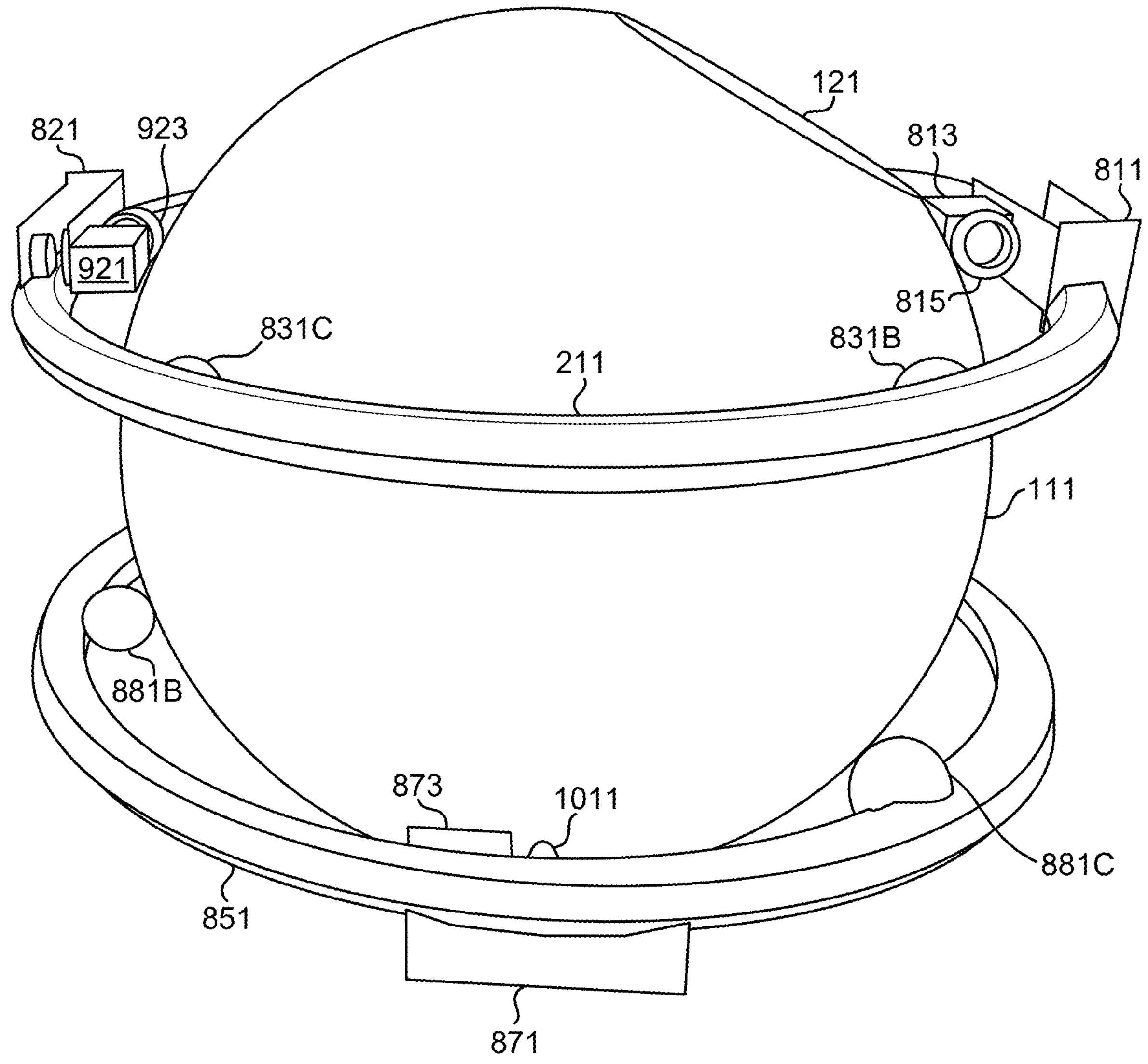
FIG. 14 illustrates an example of rotating a motor housing about a first axis, consistent with some embodiments of the present disclosure.

FIG. 14 illustrates an example of rotating a motor housing about a first axis, consistent with some embodiments of the present disclosure. The third electric motor 813 and the fifth electric motor 921 may be configured to rotate the motor housing 111 about the first axis when the friction rings 815, 923 are engaged with the motor housing 111. As shown in FIG. 14, the motor housing 111 may be rotated to such an extent that the upper opening 121 may become closer to the third electric motor 813.

Figure 15:
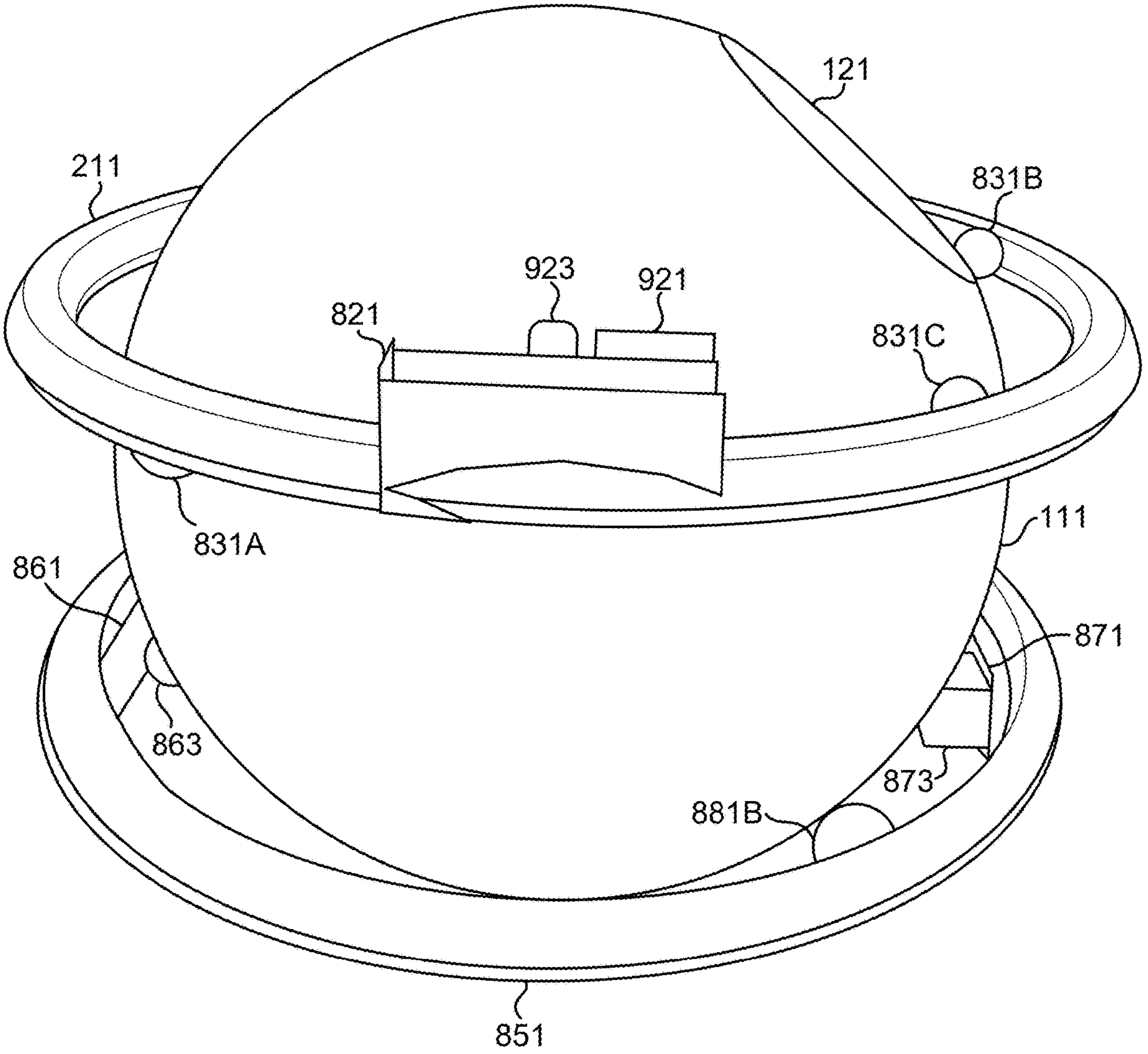
FIG. 15 illustrates an example of rotating a motor housing about a second axis, consistent with some embodiments of the present disclosure.

FIG. 15 illustrates an example of rotating a motor housing about a second axis, consistent with some embodiments of the present disclosure. The fourth electric motor 873 and the sixth electric motor may be configured to rotate the motor housing 111 about the second axis when the friction ring of the fourth electric motor 873 and the friction ring 863 of the sixth electric motor are engaged with the motor housing 111. As shown in FIG. 15, the motor housing 111 may be rotated to such an extent that the upper opening 121 may become closer to the fourth electric motor 873.

Figure 16:
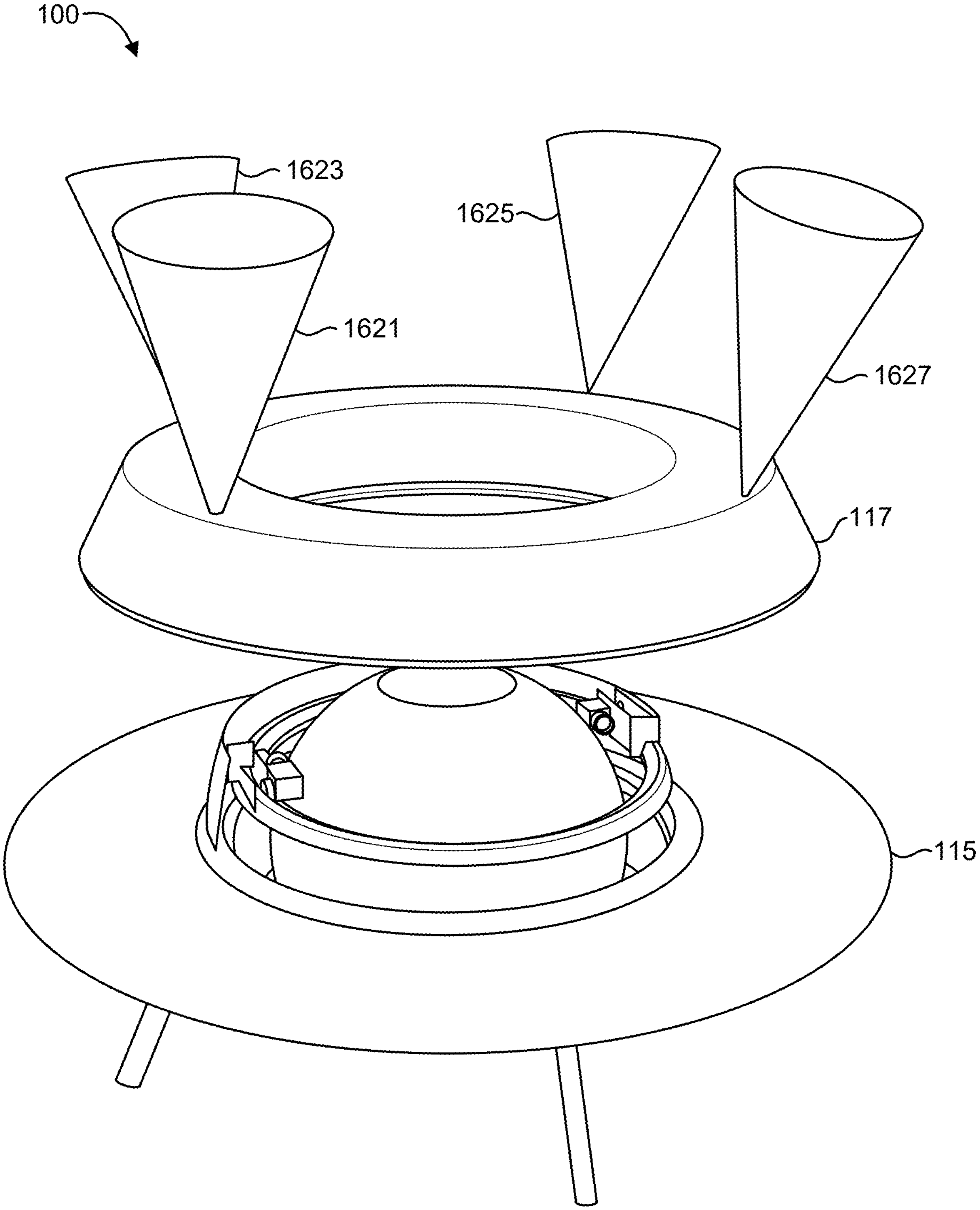
FIG. 16 illustrates an example of a disc-shaped aircraft with a detached first cabin housing with parachutes, consistent with some embodiments of the present disclosure.

FIG. 16 illustrates an example of the disc-shaped aircraft 100 with a detached first cabin housing with parachutes, consistent with some embodiments of the present disclosure. The aircraft may include one or more components of the aircraft described in connection with FIG. 1. With reference to FIG. 16, one or more parachutes (e.g., parachutes 1621, 1623, 1625, 1627) may be activated, and the first cabin housing 117 may be detached from the remainder of the aircraft. The first cabin housing 117 may be detached using one of the aforementioned techniques (e.g., as described with respect to FIGS. 1-2).

FIG. 17 illustrates a cross-sectional profile view of an example of the disc-shaped aircraft 100, consistent with some embodiments of the present disclosure. The cross-sectional view of FIG. 17 shows the aircraft 100 (e.g., of FIG. 1) split along a mid-point of the aircraft 100 (e.g., splitting the motors 511, 521 and beams of the beam structures 515, 525 in half). The aircraft may include the motor housing 111 with the upper opening 121 and the lower opening 123, the annular structure 113, the disc-shaped extension 115, the first cabin housing 117, the second cabin housing 119, elastic pieces (e.g., 125B, 1721), and landing legs (e.g., 127B, 1723). The motor housing 111 may include the first electric motor 511 and the second electric motor 521. The first electric motor 511 may be affixed to the motor housing 111 via the first beam structure 515, and/or may be connected to, and configured to drive, the first propeller 513. The second electric motor 521 may be affixed to the motor housing 111 via the second beam structure 525, and/or may be connected to, and configured to drive, the second propeller 523. The motor housing 111 may be rotatably coupled to the first ring 211 and the second ring 851. The first ring 211 and the second ring 851 may be attached to or affixed to the vertical wall of the annular structure 113. In FIG. 17, the vertical wall of the annular structure 113 may be shown to have a top side that may be flush with a top side of the first cabin housing 117, and a bottom side that may be flush with a bottom side of the second cabin housing 119. However, the height to the top side, or the depth to the bottom side, of the vertical wall of the annular structure 113 may be configured to be any suitable length as desired.

Figure 18:
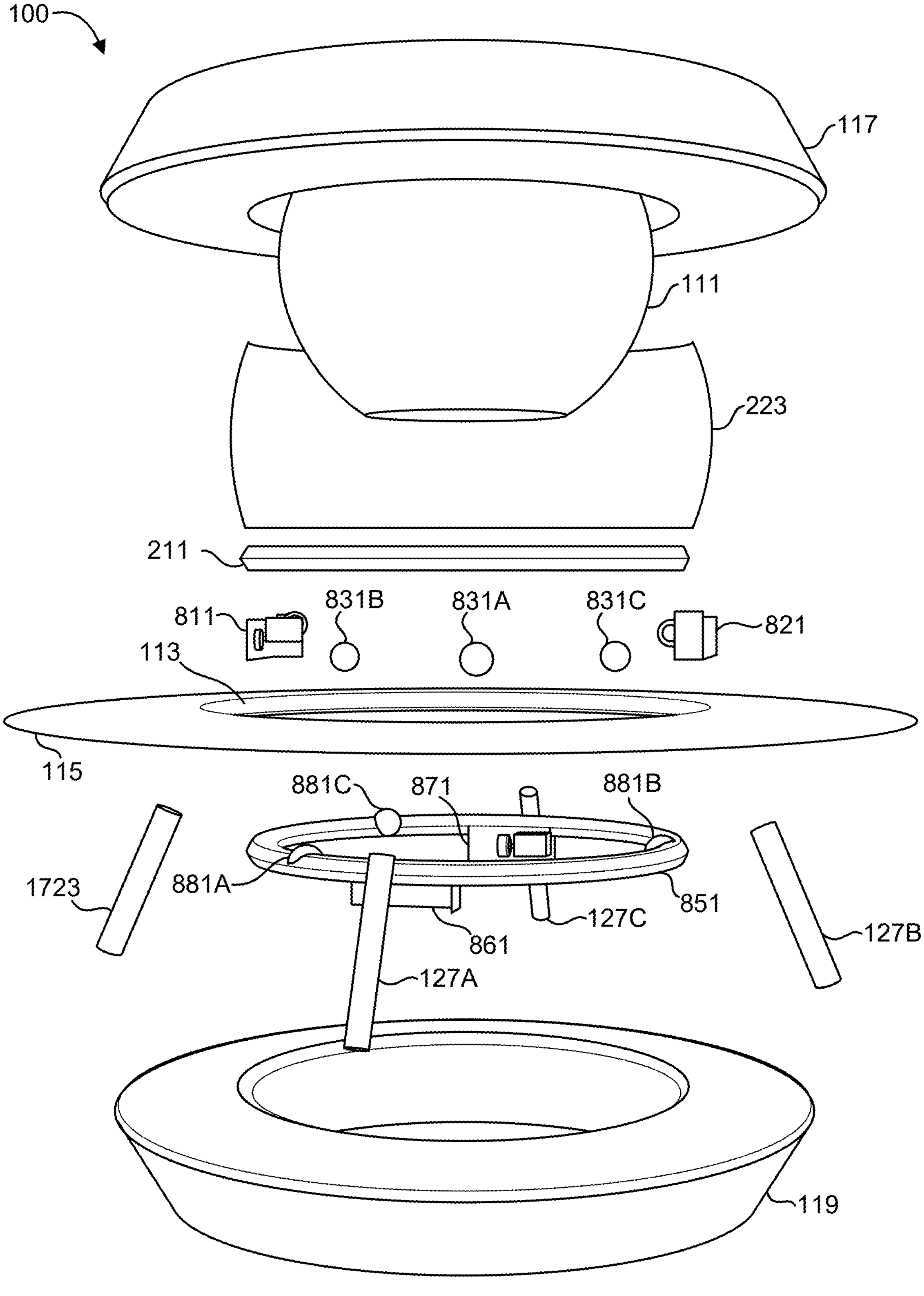
FIG. 18 illustrates an example of a disc-shaped aircraft in an exploded view, consistent with some embodiments of the present disclosure.

FIG. 18 illustrates an example of the disc-shaped aircraft 100 in an exploded view, consistent with some embodiments of the present disclosure. The aircraft may include various components shown in the exploded view, such as the motor housing 111, the annular structure 113 with the disc-shaped extension 115, the vertical wall 223 that may be connected to the annular structure 113, the first cabin housing 117, the second cabin housing 119, landing legs (e.g., the landing legs 127A, 127B, 127C, 1723), the first ring 211, and the second ring 851. The first ring 211 may be associated with bearing balls (e.g., the bearing balls 831A, 831B, 831C), and the motor engagement mechanisms 811, 821. The second ring 851 may be associated with bearing balls (e.g., the bearing balls 881A, 881B, 881C), and the motor engagement mechanisms 861, 871.

Components of the aircraft 100 may be made from any desired or suitable material. In some examples, the frame of the aircraft (such as the motor housing 111, the annular structure 113, the disc-shaped extension 115, the vertical wall 223, the first cabin housing 117, the second cabin housing 119, the landing legs 127A, 127B, 127C, 1723, the first ring 211, and/or the second ring 851) may be made from materials considering rigidity and/or weight factors, such as carbon fiber, aluminum alloys, engineering plastics (e.g., acrylonitrile butadiene styrene (ABS), polycarbonate, glass-filled nylon), or other suitable materials. In addition, the attachment, affixation, or connection between components of the aircraft may include any type of fastening, such as glue, adhesives, tapes, zip ties, nails, screws, nuts, bolts, or any other type of suitable connection. In some examples, components of the aircraft may be integrally connected.

In some examples, an aircraft as described herein (e.g., the aircraft 100) may include a computing device configured to communicate with a remote control device and to control one or more of the motors and/or motor engagement mechanisms of the aircraft (e.g., including the first electric motor, the second electric motor, the third electric motor, the fourth electric motor, the first motor engagement mechanism, and/or the second motor engagement mechanism). The aircraft may include one or more power sources connected to one or more of: the computing device, the first electric motor, the second electric motor, the third electric motor, the fourth electric motor, the first motor engagement mechanism, or the second motor engagement mechanism. The power sources may include, for example, batteries (e.g., alkaline batteries, rechargeable batteries, lithium-ion batteries, lithium-polymer batteries, solid-state batteries, or other types of batteries), hydrogen fuel cells configured to convert hydrogen and oxygen into electricity, or other types of sources configured to provide power. The connections among the power sources, the computing device, the electric motors (e.g., the first, second, third, fourth, fifth, and sixth electric motors), and/or the motor engagement mechanisms may include wired connections, such as using wires, plugs, printed circuit board connections, or other types of connections.

In some examples, the power sources and/or the computing device may be placed in a lower position within the aircraft (e.g., in the second cabin housing). This configuration may contribute to a lower center of gravity of the aircraft (e.g., lower than the center of the motor housing), which may help balance the aircraft when the aircraft is flying. The power sources and/or the computing device may have fixed positions with respect to the aircraft, such as by attaching the power sources and/or the computing device to the aircraft (e.g., to an inner surface of the second cabin housing). The power sources, the computing device, and/or other components of the aircraft may be placed in such a manner that the center of gravity of the aircraft may preferably be on the central vertical axis of the aircraft (see, e.g., axis 900 of FIG. 9), which may help balance the aircraft when the aircraft is flying. Additionally or alternatively, the motor housing (including the components within the motor housing) may be designed to weigh less than the remaining parts of the aircraft. This configuration may help balance the aircraft when the aircraft is flying.

Figure 19:
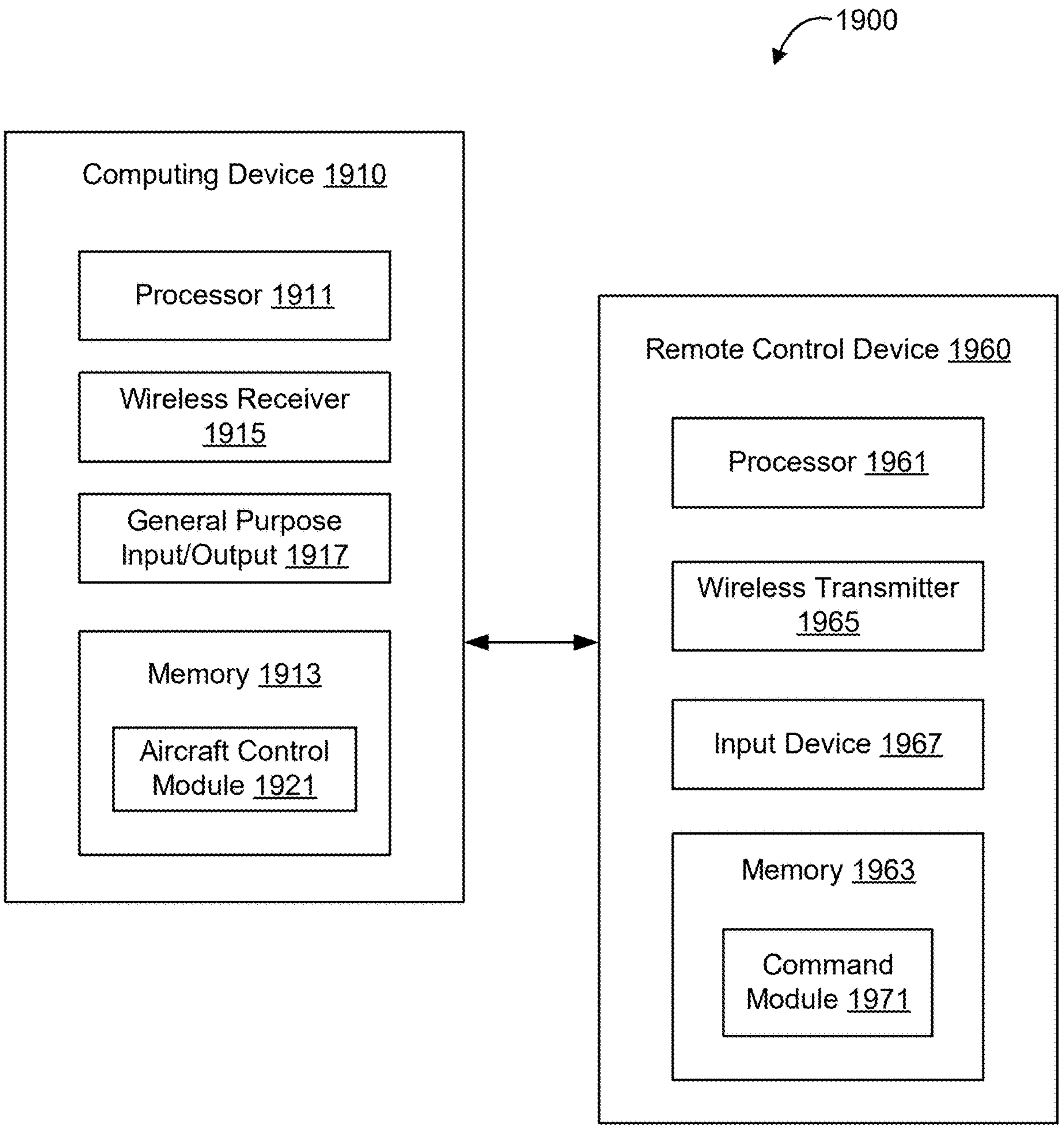
FIG. 19 illustrates an example system for controlling a disc-shaped aircraft, consistent with some embodiments of the present disclosure.

FIG. 19 illustrates an example system 1900 for controlling a disc-shaped aircraft (e.g., the aircraft 100), consistent with some embodiments of the present disclosure. The example system may include a computing device 1910 and a remote control device 1960. The computing device 1910 may be included in the disc-shaped aircraft and may be configured to control the electric motors and/or the motor engagement mechanisms within the disc-shaped aircraft. The remote control device 1960 may be configured to communicate with the computing device 1910 (e.g., by sending various control commands to the computing device 1910). In some examples, the remote control device 1960 may be operated by a user to control the disc-shaped aircraft.

The computing device 1910 may include a processor 1911, a memory 1913, a wireless receiver 1915, and/or general purpose input/output 1917. In some examples, the computing device 1910 may include additional components, or a smaller number of components, configured to perform the functions described herein.

The processor 1911 may execute instructions of a computer program to perform any of the functionalities described herein. The processor 1911 may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor 1911 may provide the ability to execute, control, run, or store multiple processes, applications, or programs. In some examples, the processor 1911 may be configured to provide parallel processing functionalities to allow a device associated with the processor to execute multiple processes simultaneously. Other types of processor arrangements may be implemented to provide the functionalities described herein.

The memory 1913 may include a non-transitory computer-readable medium that may store instructions that, when executed by the processor 1911, cause the processor 1911 to perform one or more processes as described herein. A non-transitory computer-readable medium may include any type of physical memory on which information or data readable by at least one processor may be stored. A non-transitory computer-readable medium may include, for example, random access memory (RAM), read-only memory (ROM), programmable read-only memory (PROM), erasable programmable read-only memory (EPROM), non-volatile random-access memory (NVRAM), volatile memory, non-volatile memory, flash drives, caches, registers, or any other desired data storage medium.

The wireless receiver 1915 may include any type of device configured to receive wireless signals (e.g., radio frequency signals, infrared signals, or other wireless signals). In some examples, the wireless receiver 1915 may include, for example, one or more antennas, one or more filters, one or more amplifiers, one or more demodulators, and/or other suitable components. In some examples, the wireless receiver 1915 may be configured to capture electromagnetic waves in the surrounding space and convert the received signals into a form of data that may be read or processed by the processor 1911. In some examples, the wireless receiver 1915 may be configured to receive infrared signals and convert the received signals into a form of data that may be read or processed by the processor 1911.

The general purpose input/output 1917 may include, for example, one or more uncommitted digital signal pins, on an integrated circuit or electronic circuit (e.g., microcontrollers or microprocessors) board, that may be used as an input or output, or both. The signal pins may be controllable by software. The general purpose input/output 1917 may be used by the processor 1911 to output control signals for controlling the electric motors and/or the motor engagement mechanisms in the aircraft. The control signals may, for example, cause one or more of the electric motors and/or the motor engagement mechanisms to be activated or to function in a particular mode or at a particular speed or rate. The general purpose input/output 1917 may be used by the processor 1911 to receive sensor signals from motion sensors (e.g., a micro-electro-mechanical systems (MEMS) gyroscope) to monitor and control a position or motion of the aircraft.

The memory 1913 may store an aircraft control module 1921. The aircraft control module 1921 may be configured to, based on received commands from a remote control device, cause corresponding actions to operate the aircraft. Additionally or alternatively, the aircraft control module 1921 may receive measurements from motion sensors included in or attached to the aircraft (e.g., a micro-electro-mechanical systems (MEMS) gyroscope) and may, based on the motion sensor measurements, control the balance of the aircraft when the aircraft is flying. For example, the aircraft control module 1921 may, based on the motion sensor measurements, control the speed of the first electric motor in the motor housing and the speed of the second electric motor in the motor housing to prevent the body of the aircraft from spinning (e.g., due to imbalance of torque caused to the body of the aircraft by the first electric motor and the second electric motor) when the aircraft is flying. The aircraft control module 1921 may, based on the motion sensor measurements, control one or more of the electric motors (e.g., the first, second, third, fourth, fifth, and/or sixth electric motors) and/or the motor engagement mechanisms, to stabilize or balance the aircraft when the aircraft is flying.

The remote control device 1960 may include a processor 1961, a memory 1963, a wireless transmitter 1965, and/or an input device 1967. In some examples, the remote control device 1960 may include additional components, or a smaller number of components, configured to perform the functions described herein.

The processor 1961 may execute instructions of a computer program to perform any of the functionalities described herein. The processor 1961 may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor 1961 may provide the ability to execute, control, run, or store multiple processes, applications, or programs. In some examples, the processor 1961 may be configured to provide parallel processing functionalities to allow a device associated with the processor to execute multiple processes simultaneously. Other types of processor arrangements may be implemented to provide the functionalities described herein.

The memory 1963 may include a non-transitory computer-readable medium that may store instructions that, when executed by the processor 1961, cause the processor 1961 to perform one or more processes as described herein. A non-transitory computer-readable medium may include any type of physical memory on which information or data readable by at least one processor may be stored. A non-transitory computer-readable medium may include, for example, random access memory (RAM), read-only memory (ROM), programmable read-only memory (PROM), erasable programmable read-only memory (EPROM), non-volatile random-access memory (NVRAM), volatile memory, non-volatile memory, flash drives, caches, registers, or any other desired data storage medium.

The wireless transmitter 1965 may include any type of device configured to transmit wireless signals (e.g., radio frequency signals, infrared signals, or other wireless signals). In some examples, the wireless transmitter 1965 may include, for example, one or more modulators, one or more filters, one or more amplifiers, one or more antennas, and/or other suitable components. In some examples, the wireless transmitter 1965 may be configured to convert the data that may be output by the processor 1961 into signals (e.g., radio frequency signals), and/or send electromagnetic waves in the surrounding space. In some examples, the wireless transmitter 1965 may be configured to convert the data that may be output by the processor 1961 into infrared signals, and/or transmit the infrared signals.

The input device 1967 may include, for example, any type of device configured to receive input (e.g., from a user). The input device 1967 may include, for example, buttons, switches, joysticks, a touchscreen, a touch pad, a keyboard, or other types of devices configured to detect and/or receive input (e.g., from users). The input device 1967 may include one or more input devices to receive directional commands for the aircraft and one or more input devices to receive thrust commands for the aircraft.

The memory 1963 may store a command module 1971. The command module 1971 may be configured to receive user input (e.g., via the input device 1967) for steering or operating the aircraft, and may be configured to generate, based on the user input, corresponding commands (e.g., thrust commands or directional commands) to be transmitted via the wireless transmitter 1965 to the computing device 1910.

In some examples, the computing device 1910 may be implemented using a logic circuit configured to receive command signals via a wireless receiver from the remote control device 1960 and generate corresponding control signals to control the electric motors and/or the motor engagement mechanisms of the aircraft. The remote control device 1960 may be implemented using a logic circuit configured to receive user input via an input device and generate corresponding command signals via a wireless transmitter for transmission to the computing device 1910. For example, digital electronics such as encoders and/or decoders may be used in the computing device 1910 and/or the remote control device 1960.

Figure 20:
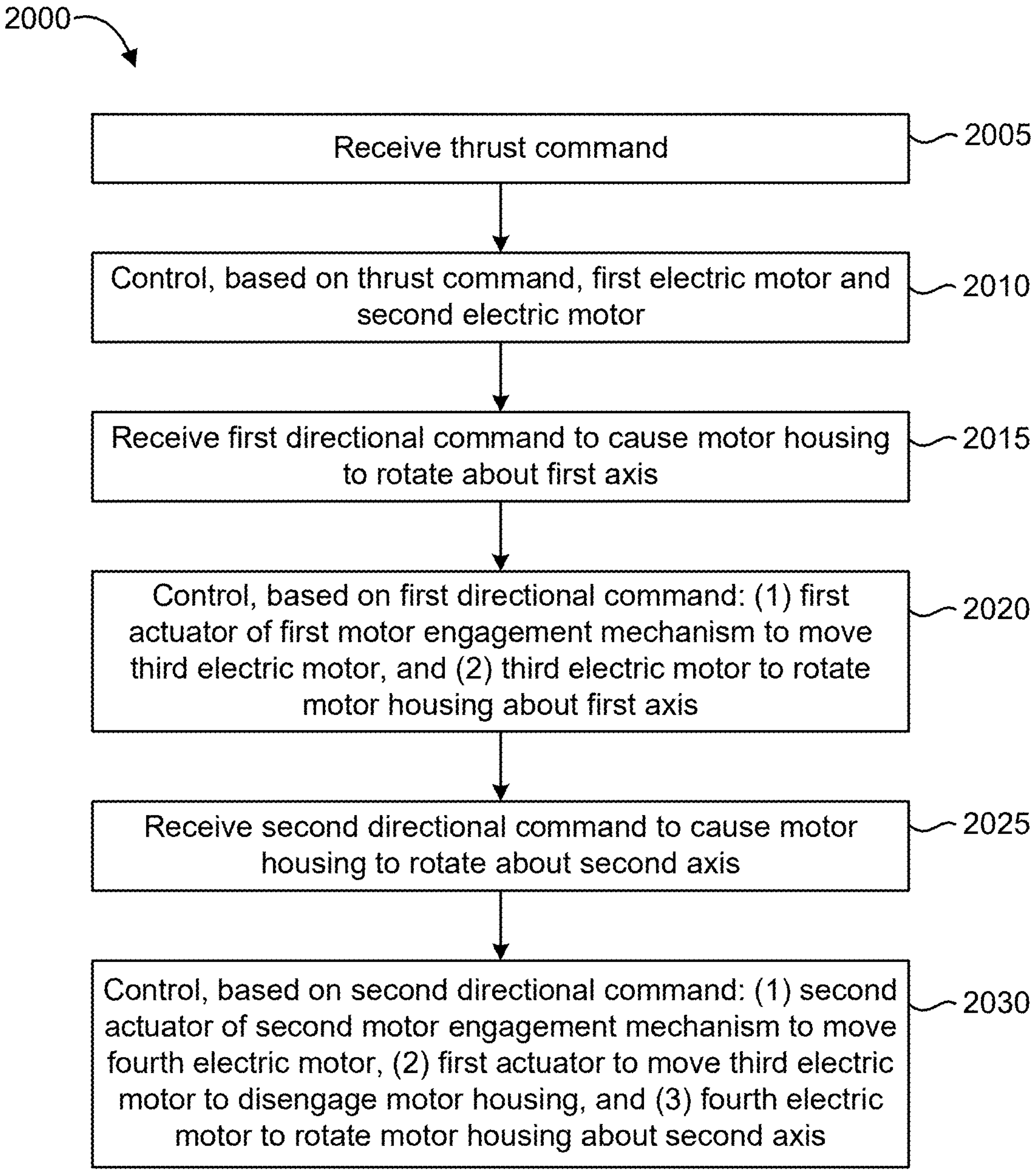
FIG. 20 illustrates a flowchart of an example method for controlling a disc-shaped aircraft, consistent with some embodiments of the present disclosure.

FIG. 20 illustrates a flowchart of an example method 2000 for controlling a disc-shaped aircraft (e.g., the aircraft 100), consistent with some embodiments of the present disclosure. The method 2000 may be performed, for example, by the computing device 1910 and/or the remote control device 1960 (e.g., to control the aircraft 100). For example, for the computing device 1910 to perform the method 2000, the processor 1911 may retrieve and execute instructions stored in the memory 1913 (e.g., instructions of the aircraft control module 1921). Additionally or alternatively, the method 2000 may be performed by any other suitable device.

In step 2005, a computing device (e.g., the computing device 1910) of an aircraft (e.g., a disc-shaped aircraft described in connection with FIGS. 1-18) may receive, from a remote control device (e.g., the remote control device 1960), a thrust command. The aircraft may include a motor housing (e.g., the motor housing 111) having a curved outer surface, an upper opening, and a lower opening. The motor housing may contain a first electric motor (e.g., the first electric motor 511) and a second electric motor (e.g., the second electric motor 521). The first electric motor may be affixed to the motor housing and may be configured to drive a first propeller. The second electric motor may be affixed to the motor housing and may be configured to drive a second propeller. The computing device may receive the thrust command, for example, after the remote control device receives a corresponding user input and, in response, transmits the thrust command to the computing device (e.g., via the wireless transmitter 1965 and the wireless receiver 1915).

In step 2010, the computing device may control, based on the thrust command, the first electric motor and the second electric motor to generate thrust. For example, the computing device may cause the first electric motor and the second electric motor to be activated. Additionally or alternatively, the thrust command may indicate a level of thrust to be generated, and the computing device may accordingly configure or adjust the first electric motor and the second electric motor to function at a corresponding speed or rate (e.g., at a particular number of revolutions per minute (RPM)) to generate the level of thrust. For example, the computing device may increase a duty cycle of a pulse width modulated (PWM) signal driving one or more power switching elements (e.g., field effect transistors (FETs)) that control the current to the motor(s) to increase thrust and may decrease the duty cycle to reduce thrust.

In step 2015, the computing device may receive, from the remote control device, a first directional command to cause the motor housing to rotate about a first axis with respect to an annular structure (e.g., the annular structure 113) with a disc-shaped extension of the aircraft. The annular structure may encircle the motor housing and may be positioned around a middle section of the motor housing between the upper opening and the lower opening. A first ring (e.g., the first ring 211) may be attached to an inner side of the annular structure. A second ring (e.g., the second ring 851) may be attached to the inner side of the annular structure. The first ring and the second ring may be configured to hold the motor housing. The computing device may receive the first directional command, for example, after the remote control device receives a corresponding user input and, in response, transmits the first directional command to the computing device (e.g., via the wireless transmitter 1965 and the wireless receiver 1915). The first directional command may indicate to rotate the motor housing 111 about a first axis.

In step 2020, the computing device may control, based on the first directional command, a first actuator of a first motor engagement mechanism (e.g., the first motor engagement mechanism 811) to move a third electric motor (e.g., the third electric motor 813) to cause a first friction ring driven by the third electric motor to contact the motor housing. For example, as described above, the computing device may cause the activation of an electromagnet (e.g., the electromagnet 1125) of the first actuator, and the repelling force between the activated electromagnet and a permanent magnet located nearby may cause the third electric motor (together with the first friction ring) to move towards and/or to engage with the motor housing (e.g., the motor housing 111).

The computing device may control, based on the first directional command, the third electric motor to rotate the motor housing about the first axis to change a direction of thrust generated by the first electric motor and the second electric motor. For example, the computing device may activate the third electric motor, and/or control the third electric motor to rotate its shaft in a particular rotational direction, for a particular distance, and/or at a particular speed or rate. Additionally or alternatively, the first directional command may indicate a time duration for which the third electric motor may be activated, and the computing device may accordingly control the third electric motor to be activated for the indicated time duration. In some examples, if one or more additional electric motors are configured to facilitate the rotation of the motor housing about the first axis in a manner consistent with the third electric motor, the computing device may activate the additional electric motor (s) to work together with the third electric motor to rotate the motor housing (e.g., the fifth electric motor 921 may be driven together with the third electric motor 813).

In step 2025, the computing device may receive, from the remote control device, a second directional command to cause the motor housing to rotate about a second axis with respect to the annular structure. The computing device may receive the second directional command, for example, after the remote control device receives a corresponding user input and, in response, transmits the second directional command to the computing device (e.g., via the wireless transmitter 1965 and the wireless receiver 1915). The second directional command may indicate to rotate the motor housing 111 about a second axis that may be orthogonal or perpendicular to the first axis corresponding to the first directional command.

In step 2030, the computing device may control, based on the second directional command, a second actuator of a second motor engagement mechanism (e.g., the second motor engagement mechanism 871) to move a fourth electric motor (e.g., the fourth electric motor 873) to cause a second friction ring driven by the fourth electric motor to contact the motor housing. For example, the computing device may cause the activation of an electromagnet of the second actuator, and the repelling force between the activated electromagnet and a permanent magnet located nearby may cause the fourth electric motor (together with the second friction ring) to move towards and/or to engage with the motor housing.

The computing device may also control, based on the second directional command, the first actuator to move the third electric motor to disengage the motor housing. For example, the computing device may cause the deactivation of the electromagnet of the first actuator, and an elastic arm (e.g., the elastic arm 1121) to which the third electric motor may be attached may (e.g., without the repelling force between the activated electromagnet and the permanent magnet located nearby) return to the natural shape of the elastic arm, and cause the third electric motor (together with the first friction ring) to move away from and/or to disengage from the motor housing.

The computing device may control, based on the second directional command, the fourth electric motor to rotate the motor housing about the second axis to change a direction of thrust generated by the first electric motor and the second electric motor. For example, the computing device may activate the fourth electric motor, and/or configure the fourth electric motor to rotate its shaft in a particular rotational direction, for a particular distance, and/or at a particular speed or rate. Additionally or alternatively, the second directional command may indicate a time duration for which the fourth electric motor may be activated, and the computing device may accordingly control the fourth electric motor to be activated for the indicated time duration. In some examples, if one or more additional electric motors are configured to facilitate the rotation of the motor housing about the second axis in a manner consistent with the fourth electric motor, the computing device may activate the additional electric motor(s) to work together with the fourth electric motor to rotate the motor housing.

In some examples, the controlling, based on the thrust command, of the first electric motor and the second electric motor to generate thrust may include controlling the first electric motor to drive the first propeller in a first rotational direction to generate airflow out of the lower opening (e.g., the lower opening 123), and controlling the second electric motor to drive the second propeller in a second rotational direction, opposite the first rotational direction, to generate airflow out of the lower opening. The first rotational direction being opposite to the second rotational direction may allow the reaction torque caused to the motor housing by the first electric motor and the reaction torque caused to the motor housing by the second electric motor to cancel each other out. The angle of the blades of the first propeller may be configured based on the first rotational direction, in order for the first propeller to generate airflow out of the lower opening. The angle of the blades of the second propeller may be configured based on the second rotational direction, in order for the second propeller to generate airflow out of the lower opening.

In some examples, an aircraft (e.g., the aircraft 100) may include a motor housing having a curved outer surface, an upper opening, and a lower opening. The aircraft may include a first propeller, a second propeller, and a first electric motor within the motor housing. The first electric motor may be affixed to the motor housing and may be configured to drive the first propeller. The aircraft may include a second electric motor within the motor housing. The second electric motor may be affixed to the motor housing and may be configured to drive the second propeller. The aircraft may include an annular structure with a disc-shaped extension. The annular structure may encircle the motor housing. The aircraft may include a first ring attached to an inner side of the annular structure, and a second ring attached to the inner side of the annular structure. The first ring and the second ring may be rotatably coupled to the motor housing to support the motor housing and to enable the motor housing to rotate with respect to the first ring and the second ring. The aircraft may include a third electric motor configured to drive a first roller to rotate the motor housing about a first axis when the first roller is engaged with the curved outer surface of the motor housing. The aircraft may include a first motor engagement mechanism including a first actuator that may be configured to move a location of the third electric motor to cause the first roller to selectively contact and disengage from the curved outer surface of the motor housing. The first roller may include, for example, a cylindrical device configured to rotate around a central axis. In some examples, the first roller may include a friction ring (e.g., the first friction ring 815).

In some examples, the aircraft may include a computing device configured to: receive, wirelessly, a thrust command from a remote control device; control the first electric motor and the second electric motor based on the thrust command; receive, wirelessly, a directional command from the remote control device; and control the third electric motor based on the directional command to rotate the motor housing to change a direction of thrust generated by the first electric motor and the second electric motor.

In some examples, the aircraft may include a fourth electric motor configured to drive a second roller to rotate the motor housing about a second axis when the second roller is engaged with the curved outer surface of the motor housing, the second axis perpendicular to the first axis. The aircraft may include a second motor engagement mechanism including a second actuator that may be configured to move a location of the fourth electric motor to cause the second roller to selectively contact and disengage from the curved outer surface of the motor housing. The computing device is further configured to: receive, wirelessly, a second directional command from the remote control device; and control the fourth electric motor based on the second directional command to rotate the motor housing to change the direction of thrust generated by the first electric motor and the second electric motor. The second roller may include, for example, a cylindrical device configured to rotate around a central axis. In some examples, the second roller may include a friction ring (e.g., the second friction ring 1011).

While illustrative examples have been described herein, the scope includes any and all embodiments having equivalent elements, modifications, omissions, combinations (e.g., of aspects across various examples), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any desired manner, including by reordering steps or inserting or deleting steps. It is intended, therefore, that the specification and examples be considered as exemplary only, with a true scope and spirit being indicated by the following claims and their full scope of equivalents.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, unless otherwise defined or limited, the phase "and/or" used with two or more items is intended to cover the items individually and the items together. For example, a device having "a and/or b" is intended to cover: a device having a (but not b); a device having b (but not a); and a device having both a and b.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on) (e.g., when the device is physically inverted), in some arrangements or embodiments. Further, references to particular rotational or other movements (e.g., counterclockwise rotation) is generally intended as a description only of movement relative to a reference frame of a particular example of illustration. Similarly, unless otherwise defined or limited, directional terms are used for convenience of reference for discussion of particular figures or examples. For example, references to downward, upward, or other directions may be used to discuss aspects of a particular example or figure, but do not necessarily require similar orientation or geometry in all installations or configurations.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system. As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure (including the various methods and flowcharts described herein) can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion herein. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way but may also be configured in ways that are not listed.

As used herein in the context of computer implementation, unless otherwise specified or limited, the terms "component," "system," "module," etc. are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

What is claimed is:

1. An aircraft comprising:
- a motor housing having a shape of a ball with an upper opening and a lower opening;
- a first propeller;
- a second propeller;
- a first electric motor within the motor housing, wherein the first electric motor is affixed to the motor housing and is configured to drive the first propeller;
- a second electric motor within the motor housing, wherein the second electric motor is affixed to the motor housing and is configured to drive the second propeller, and wherein the first electric motor and the second electric motor are configured to propel air through the upper opening and the lower opening;
- an annular structure with a disc-shaped extension, wherein the annular structure encircles the motor housing and is positioned around a middle section of the motor housing between the upper opening and the lower opening;
- a first ring attached to an inner side of the annular structure, wherein a diameter of the first ring is smaller than a diameter of the motor housing;
- a second ring attached to the inner side of the annular structure, wherein a diameter of the second ring is smaller than the diameter of the motor housing, and wherein the first ring and the second ring are configured to hold the motor housing, with the first ring encircling an upper section of the motor housing and with the second ring encircling a lower section of the motor housing;
- a third electric motor configured to drive a first friction ring to rotate the motor housing about a first axis when the first friction ring is engaged with the motor housing;
- a first motor engagement mechanism comprising a first actuator that is configured to move a location of the third electric motor to cause the first friction ring to selectively contact and disengage from the motor housing;
- a fourth electric motor configured to drive a second friction ring to rotate the motor housing about a second axis when the second friction ring is engaged with the motor housing; and
- a second motor engagement mechanism comprising a second actuator that is configured to move a location of the fourth electric motor to cause the second friction ring to selectively contact and disengage from the motor housing.

2. The aircraft of claim 1, wherein the first ring has at least three bearing balls placed on an inner side of the first ring, wherein the second ring has at least three bearing balls placed on an inner side of the second ring, and wherein the at least three bearing balls of the first ring and the at least three bearing balls of the second ring are configured to be in contact with the motor housing, and allow rotational movement of the motor housing with respect to the first ring and the second ring.

3. The aircraft of claim 1, wherein the first motor engagement mechanism comprises an elastic arm, wherein a first terminal section of the elastic arm is rotationally fixed with respect to the first ring, wherein the third electric motor is attached to a first side of a second terminal section of the elastic arm, and wherein an electromagnet is attached to a second side of the second terminal section of the elastic arm.

4. The aircraft of claim 3, wherein the first motor engagement mechanism comprises a U-shaped metal piece including the elastic arm, wherein the electromagnet is placed relative to a permanent magnet that is rotationally fixed with respect to the first ring, and wherein an activation of the electromagnet causes a positional movement of the third electric motor and causes the first friction ring to be in contact with the motor housing.

5. The aircraft of claim 1, further comprising:
- a fifth electric motor configured to facilitate rotation of the motor housing about the first axis; and
- a sixth electric motor configured to facilitate rotation of the motor housing about the second axis.

6. The aircraft of claim 1, wherein the first axis is perpendicular to the second axis.

7. The aircraft of claim 1, further comprising:
- a first cabin housing attached to an upper side of the disc-shaped extension; and
- a second cabin housing attached to a lower side of the disc-shaped extension.

8. The aircraft of claim 7, wherein the first cabin housing comprises one or more parachutes, wherein the aircraft comprises a detachment mechanism configured to allow the first cabin housing to detach from the disc-shaped extension based on the parachutes being activated.

9. The aircraft of claim 7, further comprising:
- landing legs attached to a lower side of the second cabin housing.

10. The aircraft of claim 9, further comprising:
- one or more telecommunication antennas placed in the landing legs.

11. The aircraft of claim 1, further comprising:
- a computing device configured to communicate with a remote control device and to control one or more of: the first electric motor, the second electric motor, the third electric motor, the fourth electric motor, the first motor engagement mechanism, or the second motor engagement mechanism; and
- one or more power sources connected to one or more of: the computing device, the first electric motor, the second electric motor, the third electric motor, the fourth electric motor, the first motor engagement mechanism, or the second motor engagement mechanism.

12. The aircraft of claim 1, wherein the first electric motor is configured to cause rotational force, to the motor housing, that cancels rotational force caused by the second electric motor to the motor housing.

13. The aircraft of claim 1, wherein the first friction ring comprises a rubber ring, and wherein the second friction ring comprises a rubber ring.

14. The aircraft of claim 1, wherein the first electric motor is affixed to the motor housing via a first beam structure, and wherein the second electric motor is affixed to the motor housing via a second beam structure.

15. The aircraft of claim 1, wherein the motor housing is rotatably coupled to the first ring and the second ring.

16. An aircraft comprising:
- a motor housing having a curved outer surface, an upper opening, and a lower opening;

a first propeller;

a second propeller;

a first electric motor within the motor housing, wherein the first electric motor is affixed to the motor housing and is configured to drive the first propeller;

a second electric motor within the motor housing, wherein the second electric motor is affixed to the motor housing and is configured to drive the second propeller;

an annular structure with a disc-shaped extension, wherein the annular structure encircles the motor housing;

a first ring attached to an inner side of the annular structure;

a second ring attached to the inner side of the annular structure, wherein the first ring and the second ring are rotatably coupled to the motor housing to support the motor housing and to enable the motor housing to rotate with respect to the first ring and the second ring;

a third electric motor configured to drive a first roller to rotate the motor housing about a first axis when the first roller is engaged with the curved outer surface of the motor housing; and a first motor engagement mechanism comprising a first actuator that is configured to move a location of the third electric motor to cause the first roller to selectively contact and disengage from the curved outer surface of the motor housing.

17. The aircraft of claim 16, further comprising:

a computing device configured to:

receive, wirelessly, a thrust command from a remote control device;

control the first electric motor and the second electric motor based on the thrust command;

receive, wirelessly, a directional command from the remote control device; and control the third electric motor based on the directional command to rotate the motor housing to change a direction of thrust generated by the first electric motor and the second electric motor.

18. The aircraft of claim 17, further comprising:

a fourth electric motor configured to drive a second roller to rotate the motor housing about a second axis when the second roller is engaged with the curved outer surface of the motor housing, the second axis perpendicular to the first axis; and a second motor engagement mechanism comprising a second actuator that is configured to move a location of the fourth electric motor to cause the second roller to selectively contact and disengage from the curved outer surface of the motor housing, wherein the computing device is further configured to:

receive, wirelessly, a second directional command from the remote control device; and control the fourth electric motor based on the second directional command to rotate the motor housing to change the direction of thrust generated by the first electric motor and the second electric motor.

19. A method comprising:

receiving, by a computing device of an aircraft, and from a remote control device, a thrust command, wherein the aircraft comprises a motor housing having a curved outer surface, an upper opening, and a lower opening, wherein the motor housing contains a first electric motor and a second electric motor, wherein the first electric motor is affixed to the motor housing and is configured to drive a first propeller, and wherein the second electric motor is affixed to the motor housing and is configured to drive a second propeller;

controlling, based on the thrust command, the first electric motor and the second electric motor to generate thrust;

receiving, by the computing device and from the remote control device, a first directional command to cause the motor housing to rotate about a first axis with respect to an annular structure with a disc-shaped extension of the aircraft, wherein the annular structure encircles the motor housing and is positioned around a middle section of the motor housing between the upper opening and the lower opening, wherein a first ring is attached to an inner side of the annular structure, wherein a second ring is attached to the inner side of the annular structure, and wherein the first ring and the second ring are configured to hold the motor housing;

controlling, based on the first directional command, a first actuator of a first motor engagement mechanism to move a third electric motor to cause a first friction ring driven by the third electric motor to contact the motor housing;

controlling, based on the first directional command, the third electric motor to rotate the motor housing about the first axis to change a direction of thrust generated by the first electric motor and the second electric motor; and receiving, by the computing device and from the remote control device, a second directional command to cause the motor housing to rotate about a second axis with respect to the annular structure;

controlling, based on the second directional command, a second actuator of a second motor engagement mechanism to move a fourth electric motor to cause a second friction ring driven by the fourth electric motor to contact the motor housing, and the first actuator to move the third electric motor to disengage the motor housing; and controlling, based on the second directional command, the fourth electric motor to rotate the motor housing about the second axis to change a direction of thrust generated by the first electric motor and the second electric motor.

20. The method of claim 19, wherein the controlling, based on the thrust command, of the first electric motor and the second electric motor to generate thrust comprises:

controlling the first electric motor to drive the first propeller in a first rotational direction to generate airflow out of the lower opening, and controlling the second electric motor to drive the second propeller in a second rotational direction, opposite the first rotational direction, to generate airflow out of the lower opening.

* * * * *